US011340070B2

(12) United States Patent
Nishizawa et al.

(10) Patent No.: US 11,340,070 B2
(45) Date of Patent: May 24, 2022

(54) VIBRATOR DEVICE, ELECTRONIC APPARATUS, AND VEHICLE

(71) Applicant: Seiko Epson Corporation, Tokyo (JP)

(72) Inventors: Ryuta Nishizawa, Nagano (JP); Keiichi Yamaguchi, Ina (JP); Seiichiro Ogura, Minowa (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/940,745

(22) Filed: Jul. 28, 2020

(65) Prior Publication Data

US 2021/0033398 A1 Feb. 4, 2021

(30) Foreign Application Priority Data

Jul. 29, 2019 (JP) .............................. JP2019-138430

(51) Int. Cl.
*G01C 19/5621* (2012.01)
*G01C 19/5628* (2012.01)
*G01C 19/5719* (2012.01)
*G01P 15/08* (2006.01)
*G01C 19/5642* (2012.01)

(52) U.S. Cl.
CPC ..... *G01C 19/5719* (2013.01); *G01C 19/5621* (2013.01); *G01C 19/5642* (2013.01); *G01P 15/0802* (2013.01); *G01C 19/5628* (2013.01); *G01P 2015/0814* (2013.01)

(58) Field of Classification Search
CPC ............ G01C 19/5621; G01C 19/5628; G01C 19/5642
See application file for complete search history.

(56) References Cited

U.S. PATENT DOCUMENTS

2017/0016725 A1* 1/2017 Shimizu et al. ... G01C 19/5642
2017/0102239 A1* 4/2017 Nishizawa et al. ... B81B 3/0086
2018/0274922 A1  9/2018 Nishizawa et al.

FOREIGN PATENT DOCUMENTS

| CN | 104655117 A | * | 5/2015 | ......... G01C 19/5607 |
| JP | 2010223774 A | * | 10/2010 | ............. G01C 19/56 |
| JP | 2014-089049 A | | 5/2014 | |
| JP | 2017-026336 A | | 2/2017 | |
| JP | 2018-159674 A | | 10/2018 | |

* cited by examiner

*Primary Examiner* — Jill E Culler
*Assistant Examiner* — Ruben C Parco, Jr.
(74) *Attorney, Agent, or Firm* — Harness, Dickey & Pierce, P.L.C.

(57) ABSTRACT

A vibrator device includes a vibrator element, and a support substrate disposed so as to be opposed to the vibrator element. The support substrate includes a base configured to support the vibrator element, a support configured to support the base, a plurality of beams configured to couple the base and the support to each other, and a drive signal interconnection, a drive constant-potential interconnection, a detection signal interconnection, and a detection constant-potential interconnection each laid around the base and the support passing the beams, and in predetermined one of the beams, at least one of the drive constant-potential interconnection and the detection constant-potential interconnection is disposed on a surface on the vibrator element side, and the detection signal interconnection is disposed on a surface on the opposite side.

11 Claims, 19 Drawing Sheets

FIG. 4
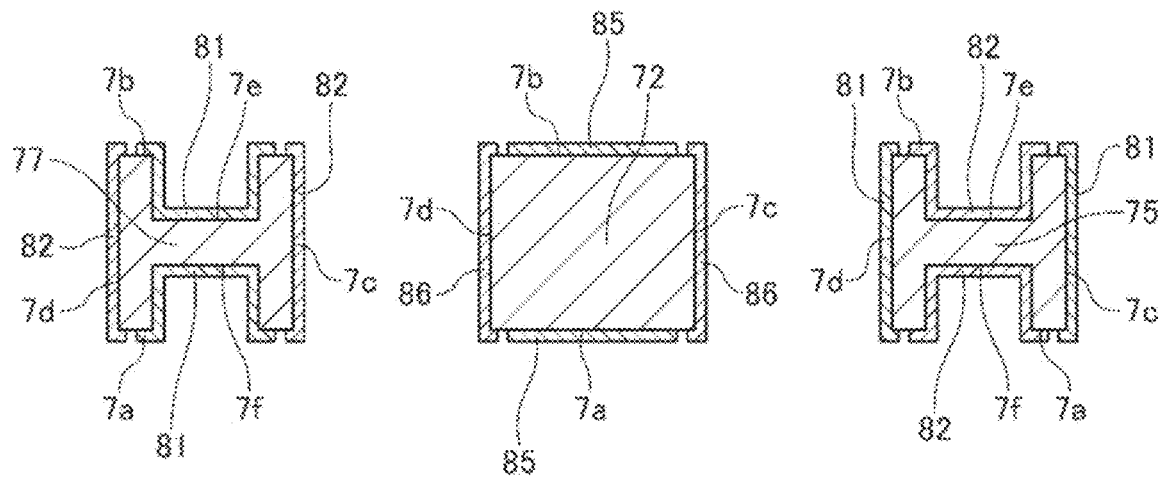
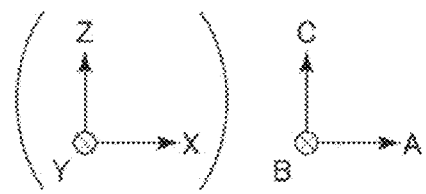
FIG. 5
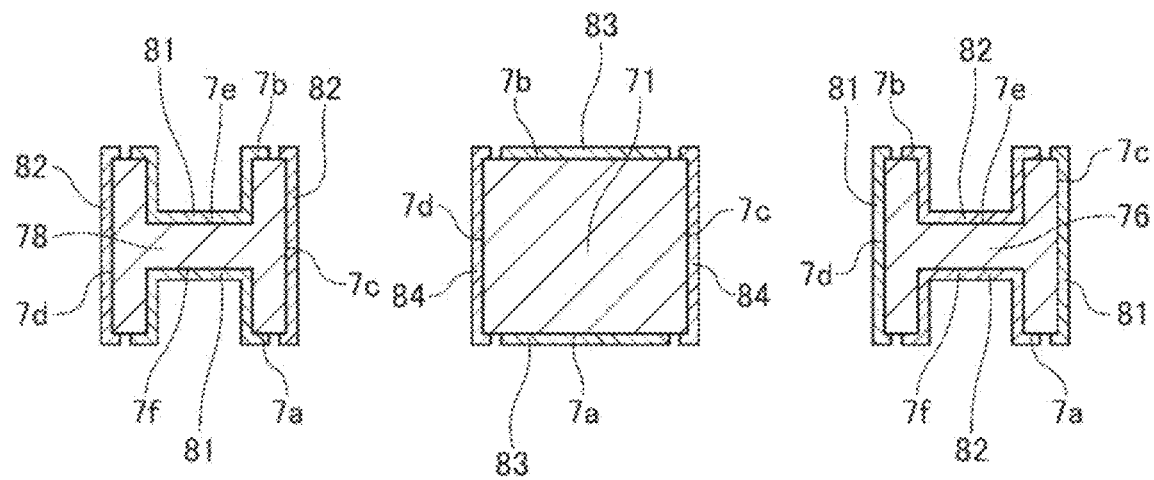
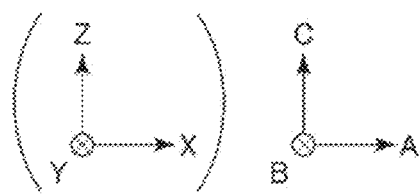

VIBRATOR DEVICE, ELECTRONIC APPARATUS, AND VEHICLE

The present application is based on, and claims priority from JP Application Serial Number 2019-138430, filed Jul. 29, 2019, the disclosure of which is hereby incorporated by reference herein in its entirety.

BACKGROUND

1. Technical Field

The present disclosure relates to a vibrator device, an electronic device, and a vehicle.

2. Related Art

In JP-A-2017-26336, there is described a vibrator device which is used as an angular velocity sensor, and has a vibrator element supported above a TAB substrate with a plurality of inner leads. The vibrator element has a drive arm and a detection arm, wherein the drive arm is provided with a drive signal electrode and a drive constant-potential electrode, and performs a drive vibration in response to a drive signal applied to the drive signal electrode, and the detection arm is provided with a detection signal electrode and a detection constant-potential electrode, and performs a detection vibration in response to inertia to thereby output a detection signal from the detection signal electrode. Meanwhile, the plurality of inner leads includes an inner lead for the drive signal electrode electrically coupled to the drive signal electrode, an inner lead for the drive constant-potential electrode electrically coupled to the drive constant-potential electrode, an inner lead for the detection signal electrode electrically coupled to the detection signal electrode, and an inner lead for the detection constant-potential electrode electrically coupled to the detection constant-potential electrode.

However, in the vibrator device described above, the inner lead for the detection signal electrode is disposed close to the drive signal electrode, and further, a member for shielding against an electric field such as a shield member does not exist therebetween. Therefore, capacitive coupling easily occurs between the inner lead for the detection signal electrode and the drive signal electrode, and there is a problem that the drive signal to be applied to the drive signal electrode is mixed as a noise into the detection signal via the inner lead for the detection signal electrode to degrade the detection accuracy of the angular velocity.

SUMMARY

A vibrator device according to the present application example includes a vibrator element, and a support substrate which is disposed so as to be opposed to the vibrator element, provided with a first surface at the vibrator element side and a second surface at an opposite side to the first surface, and supports the vibrator element, wherein the vibrator element includes a drive arm which is provided with a drive signal electrode and a drive constant-potential electrode, and performs a drive vibration in response to a drive signal applied to the drive signal electrode, and a detection arm which is provided with a detection signal electrode and a detection constant-potential electrode, and performs a detection vibration in accordance with a physical quantity of a detection target to thereby output a detection signal from the detection signal electrode, the support substrate includes a base configured to support the vibrator element, a support configured to support the base, a plurality of beams configured to couple the base and the support to each other, a drive signal interconnection which is electrically coupled to the drive signal electrode, and is laid around the base and the support passing at least one of the beams, a drive constant-potential interconnection which is electrically coupled to the drive constant-potential electrode, and is laid around the base and the support passing at least one of the beams, a detection signal interconnection which is electrically coupled to the detection signal electrode, and is laid around the base and the support passing at least one of the beams, and a detection constant-potential interconnection which is electrically coupled to the detection constant-potential electrode, and is laid around the base and the support passing at least one of the beams, and in a predetermined beam included in the plurality of beams, at least one of the drive constant-potential interconnection and the detection constant-potential interconnection is disposed on the first surface, and the detection signal interconnection is disposed on the second surface.

In the vibrator device according to the present application example, the predetermined beam may have a pair of beam side surfaces configured to couple the first surface and the second surface to each other, and in the predetermined beam, one of the drive constant-potential interconnection and the detection constant-potential interconnection may be disposed on the first surface, each of the beam side surfaces, and the second surface.

In the vibrator device according to the present application example, the predetermined beam may have a portion opposed to the drive arm.

In the vibrator device according to the present application example, the drive arm may have a third surface at the support substrate side, a fourth surface at an opposite side to the third surface, and a pair of drive arm side surfaces configured to couple the third surface and the fourth surface to each other, the drive signal electrode may be disposed on the third surface and the fourth surface, and the drive constant-potential electrode may be disposed on each of the drive arm side surfaces.

In the vibrator device according to the present application example, the drive arm may have a third surface at the support substrate side, a fourth surface at an opposite side to the third surface, and a pair of drive arm side surfaces configured to couple the third surface and the fourth surface to each other, the drive constant-potential electrode may be disposed on the third surface and the fourth surface, and the drive signal electrode may be disposed on each of the drive arm side surfaces.

In the vibrator device according to the present application example, one of the drive constant-potential interconnection and the detection constant-potential interconnection may be disposed on the first surface of the support.

In the vibrator device according to the present application example, the support may have a frame-like shape surrounding the base.

In the vibrator device according to the present application example, defining three axes perpendicular to each other as an A axis, a B axis, and a C axis, and the vibrator element and the support substrate are opposed to each other in a direction along the C axis, the vibrator element may include an element base, a pair of the detection arms extending toward both sides along the B axis from the element base, a pair of coupling arms extending toward both sides along the A axis from the element base, a pair of the drive arms extending toward both sides along the B axis from a tip part of one of the coupling arms, and a pair of the drive arms extending toward both sides along the B axis from a tip part of the other of the coupling arms, and the element base may be fixed to the base via a bonding member.

The vibrator device according to the present application example may further include a circuit element electrically coupled to the vibrator element, wherein the support substrate may be located between the vibrator element and the circuit element.

An electronic apparatus according to the present application example includes the vibrator device described above, and a signal processing circuit configured to perform signal processing based on an output signal of the vibrator device.

A vehicle according to the present application example includes the vibrator device described above, and a signal processing circuit configured to perform signal processing based on an output signal of the vibrator device.

BRIEF DESCRIPTION OF THE DRAWINGS

FIG. 4 is a cross-sectional view along the line A-A in FIG. 3.

FIG. 5 is a cross-sectional view along the line B-B in FIG. 3.

DESCRIPTION OF EXEMPLARY EMBODIMENTS

A vibrator device, an electronic apparatus, and a vehicle according to the present application example will hereinafter be described in detail based on some embodiments shown in the accompanying drawings.

First Embodiment

Figure 1:
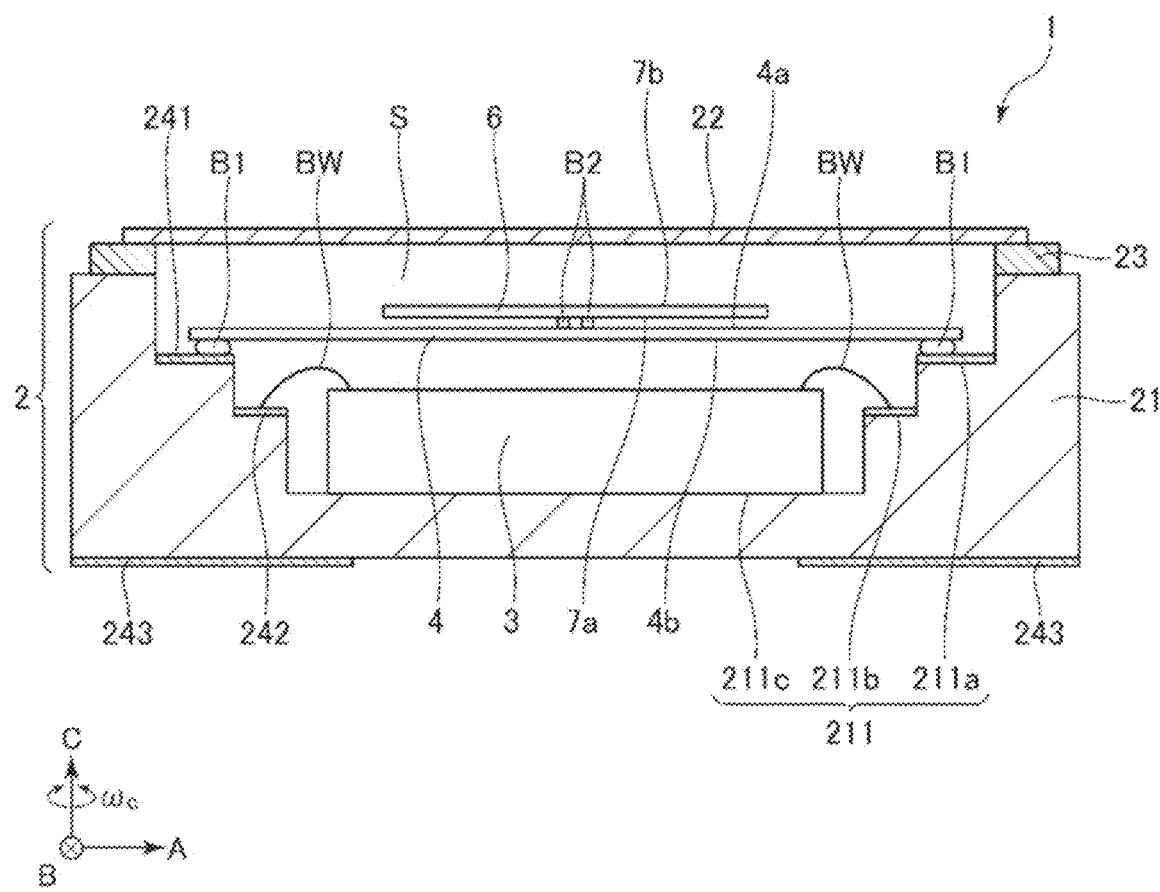
FIG. 1 is a cross-sectional view showing a vibrator device according to a first embodiment.
Figure 2:
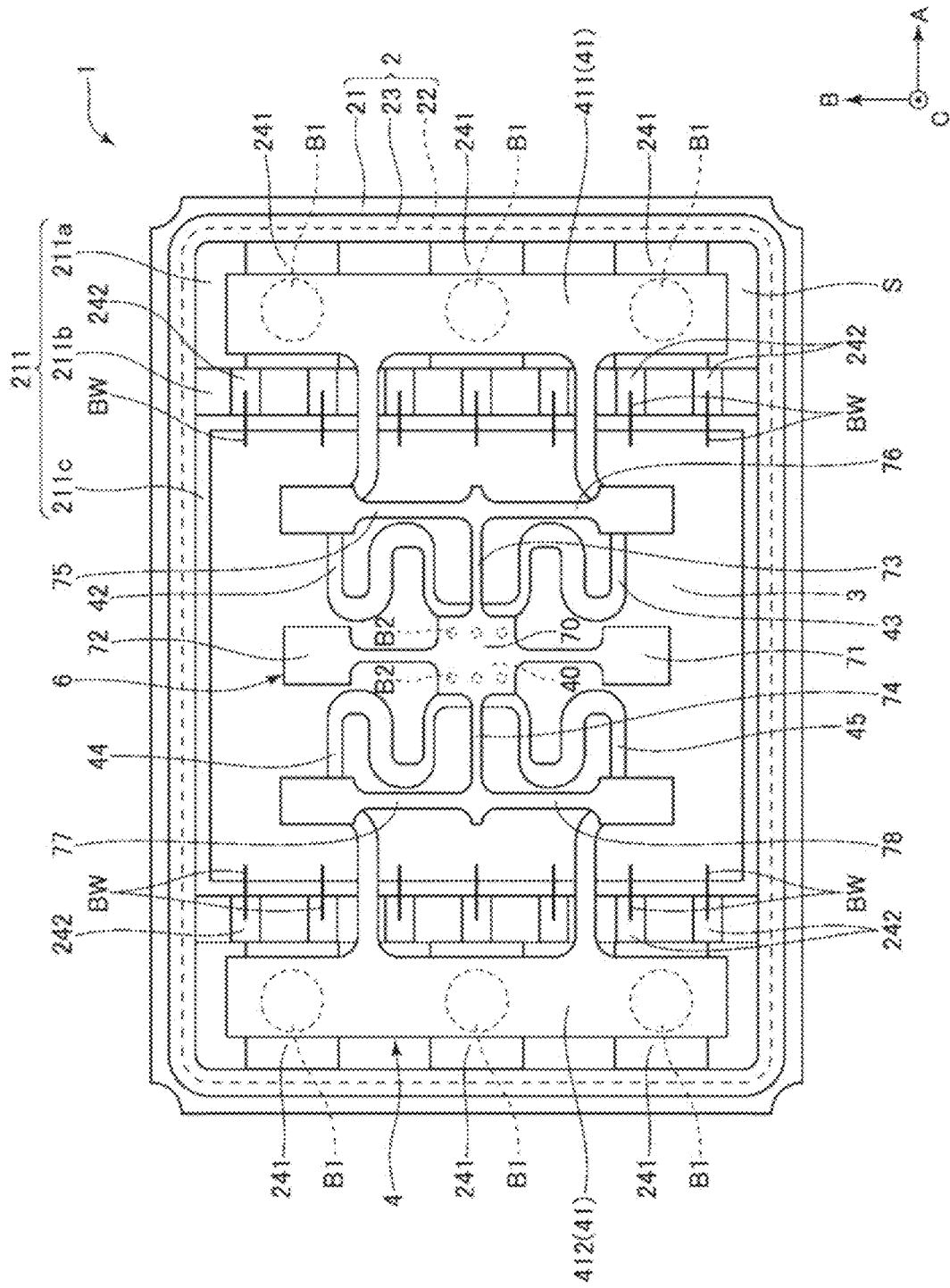
FIG. 2 is a plan view showing the vibrator device shown in FIG. 1.
Figure 3:
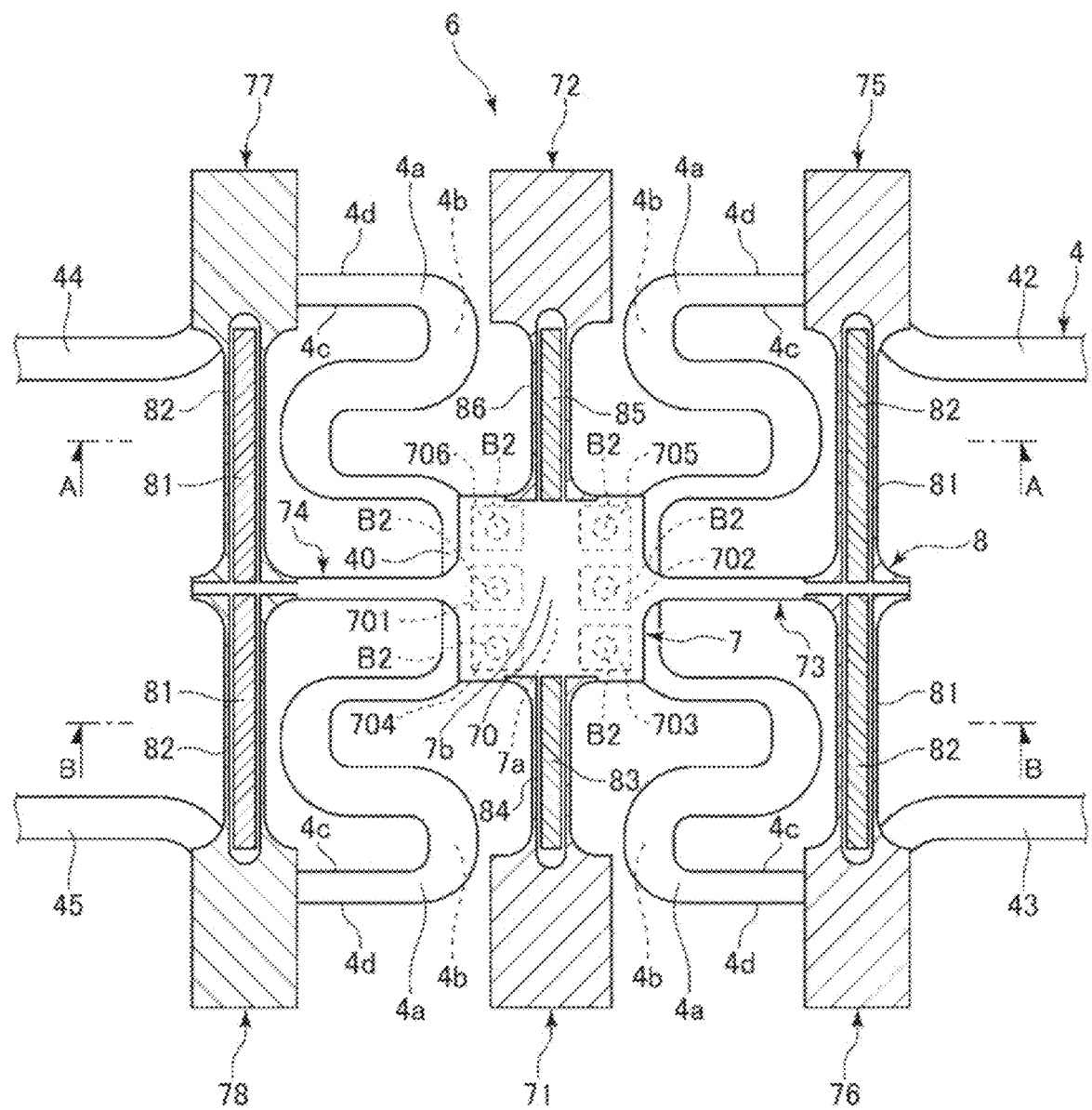
FIG. 3 is a plan view showing a vibrator element provided to the vibrator device shown in FIG. 1.
Figure 6:
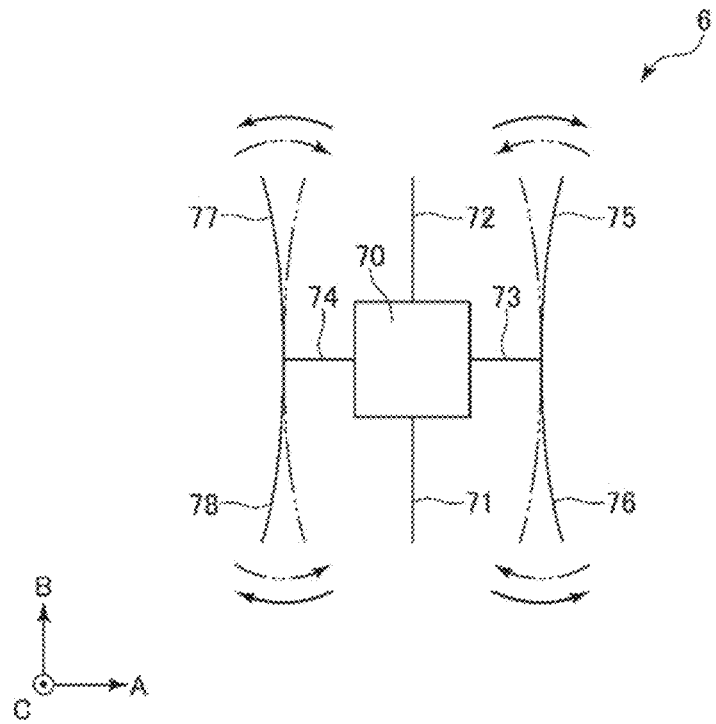
FIG. 6 is a schematic diagram for explaining drive of the vibrator element shown in FIG. 3.
Figure 7:
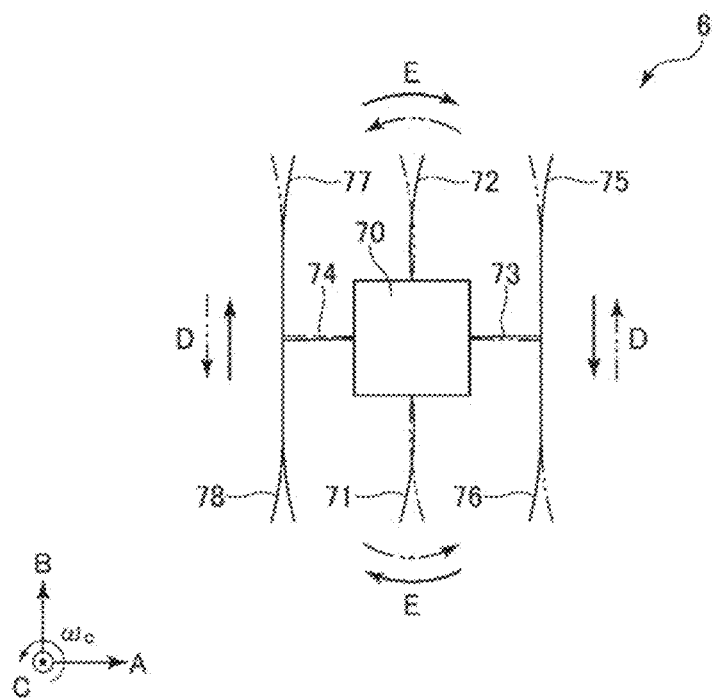
FIG. 7 is a schematic diagram for explaining drive of the vibrator element shown in FIG. 3.
Figure 8:
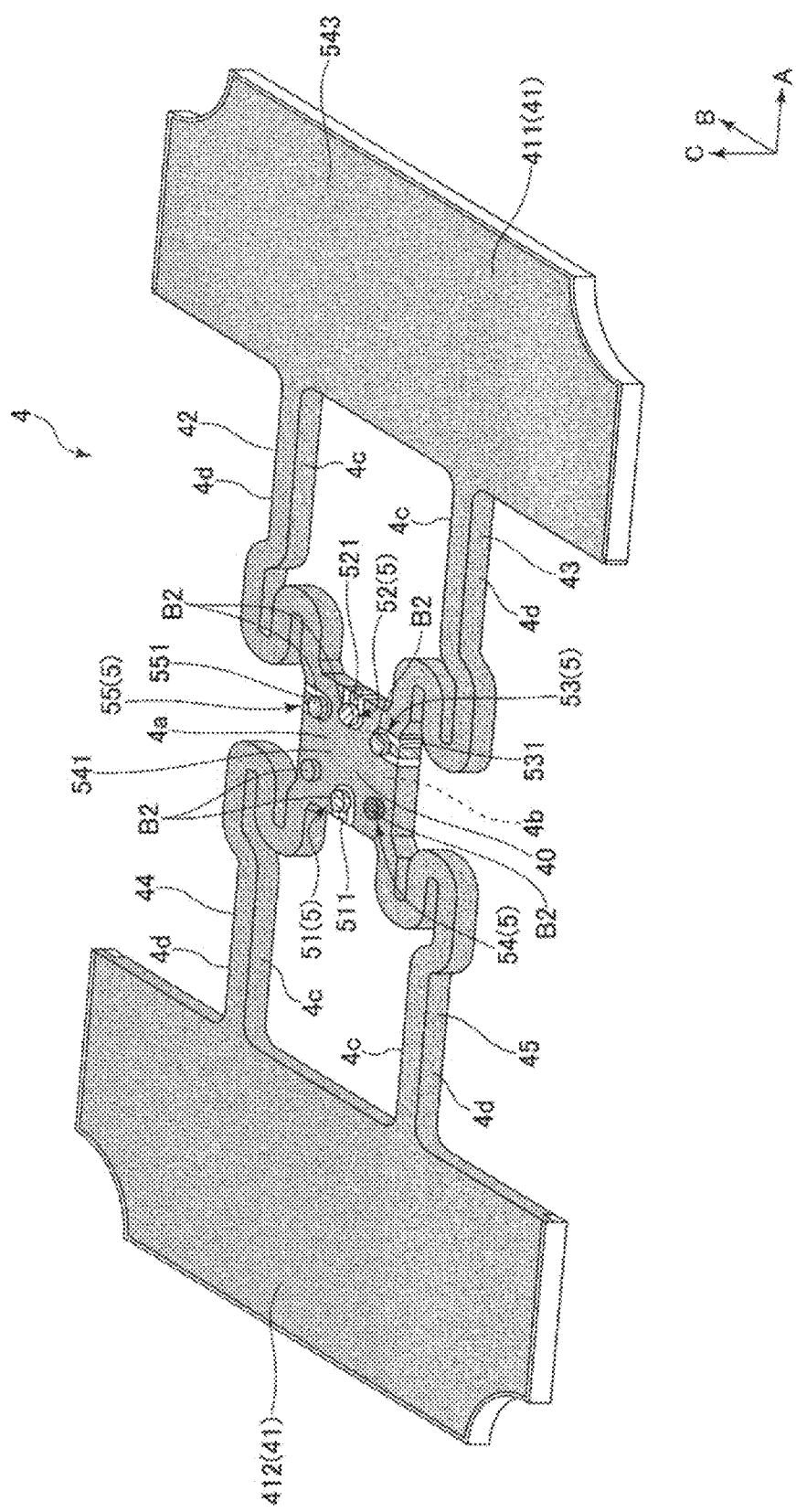
FIG. 8 is a perspective view of a support substrate viewed from an upper side.
Figure 9:
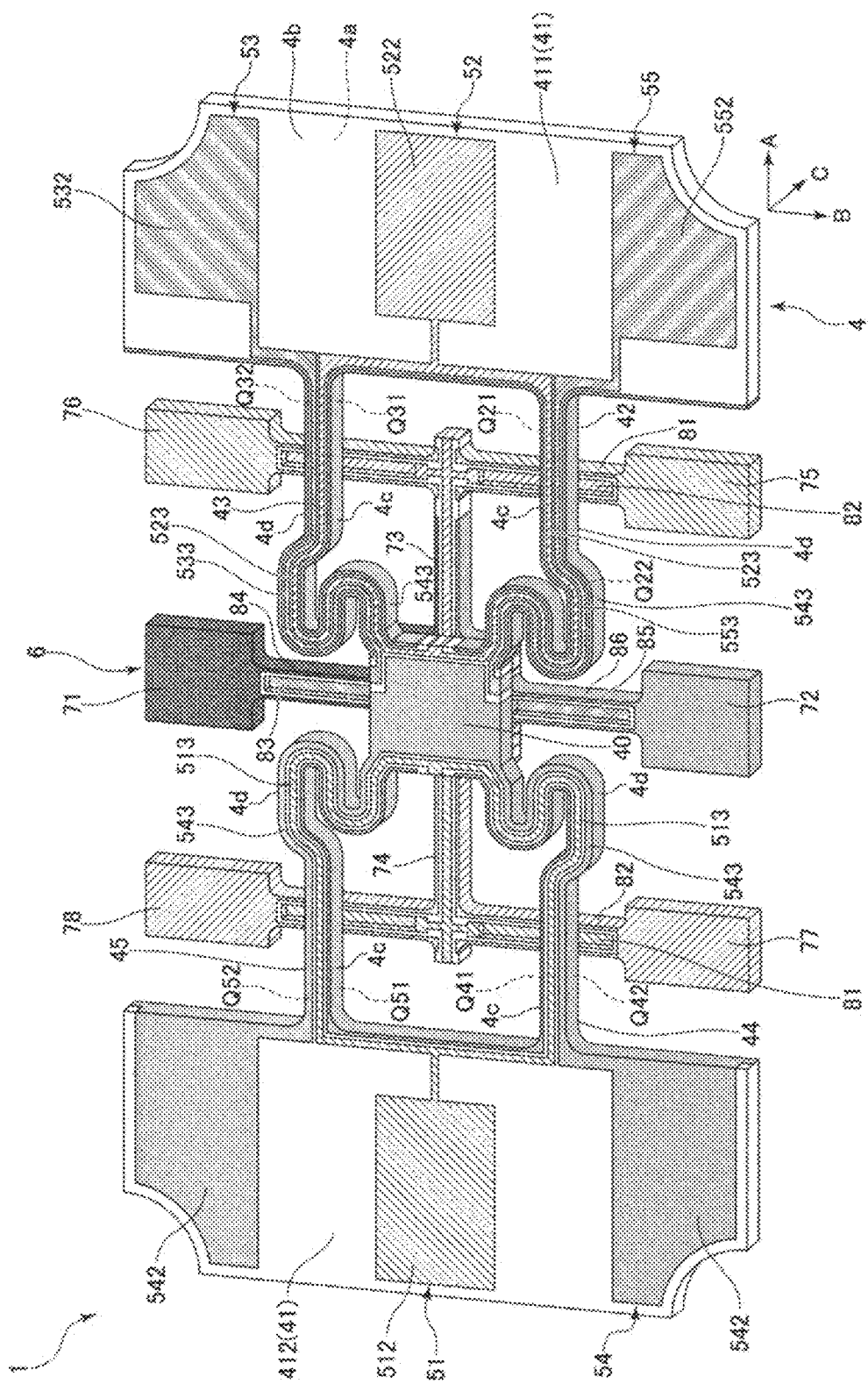
FIG. 9 is a perspective view of the support substrate viewed from a lower side.

FIG. 1 is a cross-sectional view showing a vibrator device according to a first embodiment. FIG. 2 is a plan view showing the vibrator device shown in FIG. 1. FIG. 3 is a plan view showing a vibrator element provided to the vibrator device shown in FIG. 1. FIG. 4 is a cross-sectional view along the line A-A in FIG. 3. FIG. 5 is a cross-sectional view along the line B-B in FIG. 3. FIG. 6 and FIG. 7 are each a schematic diagram for explaining drive of the vibrator element shown in FIG. 3. FIG. 8 is a perspective view of a support substrate viewed from an upper side. FIG. 9 is a perspective view of the support substrate viewed from a lower side.

It should be noted that in FIG. 1 through FIG. 9, there are illustrated an A axis, a B axis, and a C axis as three axes perpendicular to each other. Further, hereinafter, the tip side of the arrow of each of the axes is also referred to as a "positive side," and the opposite side is also referred to as a "negative side." Further, the positive side of the C axis is also referred to as "above," and the negative side is also referred to as "below." Further, the plan view from a direction along the C axis is also referred to simply as a "plan view."

The vibrator device 1 shown in FIG. 1 is a physical quantity sensor for detecting angular velocity we defining the C axis as the detection axis. As described above, by using the vibrator device 1 as the physical quantity sensor, it is possible to install the vibrator device 1 in a wide variety of electronic apparatuses, the vibrator device 1 which has a high demand, and is high in convenience is achieved. Such a vibrator device 1 has a package 2, a circuit element 3 housed in the package 2, a support substrate 4, and a vibrator element 6.

The package 2 has a base 21 provided with a recessed part 211 opening in an upper surface, and a lid 22 which closes the opening of the recessed part 211 and is bonded to the upper surface of the base 21 via a bonding member 23. The recessed part 211 forms an internal space S inside the package 2, and the circuit element 3, the support substrate 4, and the vibrator element 6 are each housed in the internal space S. For example, the base 21 can be formed of ceramics such as alumina, and the lid 22 can be formed of a metal material such as kovar. It should be noted that the constituent material of each of the base 21 and the lid 22 is not particularly limited.

The internal space S is airtightly sealed, and is set in a reduced-pressure state, and more preferably a state approximate to a vacuum state. Thus, the viscosity resistance reduces and the vibration characteristics of the vibrator element 6 are improved. It should be noted that the atmosphere in the internal space S is not particularly limited, but can also be, for example, in the atmospheric pressure state or a pressurized state.

Further, the recessed part 211 is constituted by a plurality of recessed parts, and has a recessed part 211a, a recessed part 211b, and a recessed part 211c wherein the recessed part 211a opens in an upper surface of the base 21, the recessed part 211b opens in a bottom surface of the recessed part 211a and is smaller in opening width than the recessed part 211a, and the recessed part 211c opens in a bottom surface of the recessed part 211b and is smaller in opening width than the recessed part 211b. Further, to the bottom surface of the recessed part 211a, there is fixed the support substrate 4 in a state of supporting the vibrator element 6, and to the bottom surface of the recessed part 211c, there is fixed the circuit element 3.

Further, as shown in FIG. 2, in the internal space S, the vibrator element 6, the support substrate 4, and the circuit element 3 are disposed so as to overlap each other in a plan view. In other words, the vibrator element 6, the support substrate 4, and the circuit element 3 are arranged along the C axis. Thus, it is possible to suppress the planar spread towards the directions along the A axis and the B axis of the package 2, and thus, it is possible to achieve reduction in size of the vibrator device 1. Further, the support substrate 4 is located between the vibrator element 6 and the circuit element 3, and supports the vibrator element 6 so as to hold the vibrator element 6 from the lower side, namely the negative side of the C axis.

Further, as shown in FIG. 1 and FIG. 2, on the bottom surface of the recessed part 211a, there is disposed a plurality of internal terminals 241, on the bottom surface of the recessed part 211b, there is disposed a plurality of internal terminals 242, and on the lower surface of the base 21, there is disposed a plurality of external terminals 243. The internal terminals 241, 242 and the external terminals 243 described above are electrically coupled via interconnections not shown formed inside the base 21. Further, the internal terminals 241 are electrically coupled to the vibrator element 6 via bonding members B1, B2 having electrical conductivity and the support substrate 4, and the internal terminals 242 are electrically coupled to the circuit element 3 via bonding wires BW.

The vibrator element 6 is an angular velocity sensor element capable of detecting the angular velocity ωc defining the C axis as the detection axis as the physical quantity sensor element. As shown in FIG. 3, the vibrator element 6 has a vibrating substrate 7, and electrodes 8 disposed on a surface of the vibrating substrate 7. The vibrating substrate 7 is formed of a Z-cut quartz crystal substrate. The Z-cut quartz crystal substrate has spread in an X-Y plane defined by an X axis as the electrical axis and a Y axis as the mechanical axis, the electrical axis and the mechanical axis being crystal axes of the quartz crystal, and has a thickness in a direction along a Z axis as an optical axis.

The vibrator element 6 has a plate-like shape, and has a lower surface 7a as a third surface which is a principal surface at the support substrate 4 side, and an upper surface 7b as a fourth surface which is a principal surface at the opposite side to the lower surface 7a. Further, the vibrating substrate 7 has an element base 70, a pair of detection arms 71, 72, a pair of coupling arms 73, 74, a pair of drive arms 75, 76, and a pair of drive arms 77, 78, wherein the element base 70 is located in a central part, the pair of detection arms 71, 72 extend toward both sides along the B axis from the element base 70, the pair of coupling arms 73, 74 extend toward both sides along the A axis from the element base 70, the pair of drive arms 75, 76 extend toward both sides along the B axis from a tip part of the coupling arm 73, and the pair of drive arms 77, 78 extend toward both sides along the B axis from a tip part of the coupling arm 74.

Further, as shown in FIG. 4 and FIG. 5, the detection arms 71, 72 and the drive arms 75 through 78 each have the upper surface 7b, the lower surface 7a, and side surfaces 7c, 7d as a pair of drive arm side surfaces each connecting the upper surface 7b and the lower surface 7a. Further, in each of the drive arms 75 through 78, the upper surface 7b has a recessed part 7e recessed downward, and the lower surface 7a has a recessed part 7f recessed upward. In other words, the detection arms 71, 72 each have a substantially rectangular lateral cross-sectional shape, and the drive arms 75 through 78 each have substantially H-like lateral cross-sectional shape.

The electrodes 8 have a drive signal electrode 81, a drive constant-potential electrode 82, a first detection signal electrode 83, a first detection ground electrode 84 as a detection constant-potential electrode, a second detection signal electrode 85, and a second detection ground electrode 86 as the detection constant-potential electrode. It should be noted that the drive constant-potential electrode 82 is an electrode on a constant-potential side corresponding to the drive signal electrode 81, and is connected to a low potential. It should be noted that the drive constant-potential electrode 82 can be connected to the ground. The first detection ground electrode 84 is the ground with respect to the first detection signal electrode 83, and the second detection ground electrode 86 is the ground with respect to the second detection signal electrode 85.

The drive signal electrode 81 is disposed on the both side surfaces 7c, 7d of each of the drive arms 75, 76, and the upper surface 7b and the lower surface 7a of each of the drive arms 77, 78. Meanwhile, the drive constant-potential electrode 82 is disposed on the upper surface 7b and the lower surface 7a of each of the drive arms 75, 76, and the both side surfaces 7c, 7d of each of the drive arms 77, 78. Further, the first detection signal electrode 83 is disposed on the upper surface 7b and the lower surface 7a of the detection arm 71, and the first detection ground electrode 84 is disposed on the both side surfaces 7c, 7d of the detection arm 71. Meanwhile, the second detection signal electrode 85 is disposed on the upper surface 7b and the lower surface 7a of the detection arm 72, and the second detection ground electrode 86 is disposed on the both side surfaces 7c, 7d of the detection arm 72.

Further, these electrodes 81 through 86 are each laid around to the lower surface of the element base 70. Therefore, on the lower surface of the element base 70, there are disposed a terminal 701, a terminal 702, a terminal 703, a terminal 704, a terminal 705, and a terminal 706 wherein the terminal 701 is electrically coupled to the drive signal electrode 81, the terminal 702 is electrically coupled to the drive constant-potential electrode 82, the terminal 703 is electrically coupled to the first detection signal electrode 83, the terminal 704 is electrically coupled to the first detection ground electrode 84, the terminal 705 is electrically coupled to the second detection signal electrode 85, and the terminal 706 is electrically coupled to the second detection ground electrode 86.

Such a vibrator element 6 detects the angular velocity ωc in the following manner. Firstly, when applying a drive signal between the drive signal electrode 81 and the drive constant-potential electrode 82, the drive arms 75 through 78 make a flexural vibration along a plane parallel to the A axis and the B axis, and along the A axis as shown in FIG. 6. Hereinafter, this drive mode is referred to as a drive vibration mode. Further, when the angular velocity ωc is applied to the vibrator element 6 in the state of performing the drive in the drive vibration mode, the detection vibration mode shown in FIG. 7 is newly excited. In the detection vibration mode, a Coriolis force acts on the drive arms 75 through 78 to excite the vibration in a direction indicated by the arrow D, and in concert with this vibration, the detection vibration due to the flexural vibration occurs in a direction indicated by the arrow E in the detection arms 71, 72. A charge generated in the detection arm 71 due to such a detection vibration mode is taken out between the first detection signal electrode 83 and the first detection ground electrode 84 as a first detection signal, a charge generated in the detection arm 72 is taken out between the second detection signal electrode 85 and the second detection ground electrode 86 as a second detection signal, and it is possible to detect the angular velocity ωc based on these first and second detection signals.

Going back to FIG. 1, the circuit element 3 is fixed to the bottom surface of the recessed part 211c. The circuit element 3 includes a drive circuit and a detection circuit for driving the vibrator element 6 to detect the angular velocity ωc applied to the vibrator element 6. It should be noted that the circuit element 3 is not particularly limited, but can include other circuits such as a temperature compensation circuit.

Further, the support substrate 4 has a plate-like shape having an upper surface 4a as a first surface which is a principal surface at the vibrator element 6 side, and a lower surface 4b as a second surface which is a principal surface at the opposite side to the upper surface 4a. Further, as shown in FIG. 2, the support substrate 4 has the base 40, a support 41, a pair of beams 42, 43, and a pair of beams 44, 45 wherein the support 41 supports the base 40, and is provided with a first support 411 and a second support 412 disposed so as to be separated from each other on both sides along the A axis across the base 40, the pair of beams 42, 43 couple the base 40 and the first support 411 to each other, and the pair of beams 44, 45 couple the base 40 and the second support 412 to each other.

Further, the element base 70 of the vibrator element 6 is fixed to the base 40 via the bonding members B2 having electrical conductivity, and the first support 411 and the second support 412 are each fixed to the bottom surface of the recessed part 211a via the bonding member B1. In other words, the vibrator element 6 is fixed to the base 21 via the support substrate 4. By making the support substrate 4 intervene between the vibrator element 6 and the base 21 as described above, it is possible to absorb or relax the stress propagating from the base 21 due to the support substrate 4, and thus, it becomes difficult for the stress to reach the vibrator element 6. Therefore, it is possible to effectively prevent the degradation and the fluctuation of the vibration characteristics of the vibrator element 6.

In particular, in the present embodiment, the first and second supports 411, 412 are each located outside the vibrator element 6 in a plan view. Specifically, the first support 411 is located on the positive side in the A axis of the vibrator element 6, and the second support 412 is located on the negative side in the A axis thereof. Thus, it is possible to dispose the first and second supports 411, 412 so as to sufficiently be distant from each other across the vibrator element 6, and therefore, it is possible to support the vibrator element 6 in a more stable posture. Therefore, the vibration characteristics of the vibrator element 6 are improved.

It should be noted that the bonding members B1, B2 are not particularly limited providing both of electrical conductivity and a bonding property are provided, and it is possible to use, for example, a variety of metal bumps such as gold bumps, silver bumps, copper bumps, or solder bumps, or an electrically conductive adhesive having an electrically conductive filler such as a silver filler dispersed in a variety of adhesives such as a polyimide type adhesive, an epoxy type adhesive, a silicone type adhesive, or an acrylic adhesive. When using the metal bumps which are in the former group as the bonding members B1, B2, it is possible to suppress generation of a gas from the bonding members B1, B2, and it is possible to efficiently prevent a change in environment, in particular rise in pressure, of the internal space S. On the other hand, when using the electrically conductive adhesive which is in the latter group as the bonding members B1, B2, the bonding members B1, B2 become relatively soft, and it is possible to absorb or relax the stress described above also in the bonding members B1, B2.

In the present embodiment, the electrically conductive adhesive is used as the bonding members B1, and the metal bumps are used as the bonding members B2. By using the electrically conductive adhesive as the bonding members B1 for bonding the support substrate 4 and the base 21 as materials different in type from each other, the thermal stress caused by a difference in thermal expansion coefficient therebetween can efficiently be absorbed or relaxed by the bonding members B1. On the other hand, since the support substrate 4 and the vibrator element 6 are bonded to each other with six bonding members B2 disposed in a relatively small area, by using the metal bumps as the bonding members B2, wetting spread which occurs in the case of the electrically conductive adhesive is prevented, and thus, it is possible to effectively prevent the bonding members B2 from having contact with each other.

As shown in FIG. 3, the beams 42, 43, 44, and 45 each have a portion meandering to form an S-shape in the middle thereof, and each form a shape easy to elastically deform in a direction along the A axis, a direction along the B axis, and a direction along the C axis. By the beams 42 through 45 deforming in the direction along the A axis, the direction along the B axis, and the direction along the C axis, it is possible to effectively absorb or relax the stress propagating from the base 21. It should be noted that the shapes of the beams 42 through 45 are each not particularly limited, but can be provided with, for example, a straight shape with the meandering portion omitted. Further, it is possible for at least one of the beams 42 through 45 to be different in shape from the others.

Further, in the plan view from the direction along the C axis, the drive arm 75 of the vibrator element 6 overlaps the beam 42, the drive arm 76 overlaps the beam 43, the drive arm 77 overlaps the beam 44, and the drive arm 78 overlaps the beam 45. Therefore, when the drive arms 75 through 78 are distorted in a direction along the C axis due to an impact or the like, the drive arms 75 through 78 have contact with the beams 42 through 45 to thereby be prevented from being further distorted excessively. In other words, the beams 42 through 45 function as stoppers for preventing the drive arms 75 through 78 from excessively deforming in the direction along the C axis. Thus, it is possible to prevent breakage of the vibrator element 6. In particular, since the beams 42 through 45 are soft regions in the support substrate 4, by making the drive arms 75 through 78 have contact with the beams 42 through 45, it is also possible to relax the impact when having contact with each other.

Further, the beams 42, 43, 44, and 45 each have a substantially rectangular lateral cross-sectional shape, and each have the upper surface 4a, the lower surface 4b, and side surfaces 4c, 4d as a pair of beam side surfaces for connecting the upper surface 4a and the lower surface 4b to each other.

Such a support substrate 4 is formed of a quartz crystal substrate. By forming the support substrate 4 of the quartz crystal substrate similarly to the vibrating substrate 7 as described above, it is possible to make the support substrate 4 and the vibrating substrate 7 equal in thermal expansion coefficient to each other. Therefore, the thermal stress caused by the difference in thermal expansion coefficient from each other does not substantially occur between the support substrate 4 and the vibrating substrate 7, and it becomes more difficult for the vibrator element 6 to be subjected to stress. Therefore, it is possible to more effectively prevent the degradation and the fluctuation of the vibration characteristics of the vibrator element 6.

In particular, the support substrate 4 is formed of the quartz crystal substrate with the same cutting angle as that in the vibrating substrate 7 provided to the vibrator element 6. In the present embodiment, since the vibrating substrate 7 is formed of a Z-cut quartz crystal substrate, the support substrate 4 is also formed of the Z-cut quartz crystal substrate. Further, the directions of the crystal axes of the support substrate 4 coincide with the directions of the crystal axes of the vibrating substrate 7. In other words, the support substrate 4 and the vibrating substrate 7 coincide with each other in the X axis, the Y axis, and the Z axis. Since the quartz crystal is different in thermal expansion coefficient between the direction along the X axis, the direction along the Y axis, and the direction along the Z axis, by making the support substrate 4 and the vibrating substrate 7 the same in cutting angle to uniform the directions of the crystal axes, it becomes more difficult for the thermal stress described above to occur between the support substrate 4 and the vibrating substrate 7. Therefore, it becomes more difficult for the vibrator element 6 to be subjected to stress, and thus, it is possible to more effectively prevent the degradation and the fluctuation of the vibration characteristics of the vibrator element 6.

It should be noted that the support substrate 4 is not limited thereto, but can also be different in directions of the crystal axes from the vibrating substrate 7 although the same in cutting angle as the vibrating substrate 7. Further, the support substrate 4 can also be formed of a quartz crystal substrate different in cutting angle from the vibrating substrate 7. Further, the support substrate 4 is not required to be formed of the quartz crystal substrate. In this case, it is preferable for the constituent material of the support substrate 4 to be a material having a difference in thermal expansion coefficient from the quartz crystal smaller than a difference in thermal expansion coefficient between the quartz crystal and the constituent material of the base 21.

Further, on the support substrate 4, there are disposed interconnections 5 for electrically coupling the vibrator element 6 and the internal terminals 241 to each other. The interconnections 5 include a drive signal interconnection 51, a drive constant-potential interconnection 52, a first detection signal interconnection 53, a detection ground interconnection 54, and a second detection signal interconnection 55 wherein the drive signal interconnection 51 electrically couples the terminal 701 and the internal terminal 241 to each other, the drive constant-potential interconnection 52 electrically couples the terminal 702 and the internal terminal 241 to each other, the first detection signal interconnection 53 as a detection signal interconnection electrically couples the terminal 703 and the internal terminal 241 to each other, the detection ground interconnection 54 as a detection constant-potential interconnection electrically couples the terminals 704, 706 and the internal terminal 241 to each other, and the second detection signal interconnection 55 as a detection signal interconnection electrically couples the terminal 705 and the internal terminal 241 to each other.

As shown in FIG. 8 and FIG. 9, the drive signal interconnection 51 has terminals 511, 512 and an interconnection 513 wherein the terminal 511 is located at one end part of the drive signal interconnection 51, and is disposed on the upper surface 4a of the base 40, the terminal 512 is located at the other end part of the drive signal interconnection 51, and is disposed on the lower surface 4b of the second support 412, and the interconnection 513 electrically couples the terminals 511, 512 to each other. Further, the interconnection 513 is laid around the base 40 and the second support 412 passing the lower surfaces 4b of the beams 44, 45 to electrically couple the terminals 511, 512 to each other. It should be noted that the lower surface 4b of the beam 44 has two areas Q41, Q42 obtained by dividing the lower surface 4b into two areas substantially equal to each other in the width direction, and similarly, the lower surface 4b of the beam 45 has two areas Q51, Q52 obtained by dividing the lower surface 4b into two areas substantially equal to each other in the width direction. Further, the interconnection 513 is laid around the base 40 and the second support 412 passing inside the area Q41 in the lower surface 4b of the beam 44, and is then laid around the base 40 and the second support 412 passing inside the area Q51 in the lower surface 4b of the beam 45.

The drive constant-potential interconnection 52 has terminals 521, 522 and an interconnection 523 wherein the terminal 521 is located at one end part of the drive constant-potential interconnection 52, and is disposed on the upper surface 4a of the base 40, the terminal 522 is located at the other end part of the drive constant-potential interconnection 52, and is disposed on the lower surface 4b of the first support 411, and the interconnection 523 electrically couples the terminals 521, 522 to each other. Further, the interconnection 523 is laid around the base 40 and the first support 411 passing the lower surfaces 4b of the beams 42, 43 to electrically couple the terminals 521, 522 to each other. It should be noted that the lower surface 4b of the beam 42 has two areas Q21, Q22 obtained by dividing the lower surface 4b into two areas substantially equal to each other in the width direction, and similarly, the lower surface 4b of the beam 43 has two areas Q31, Q32 obtained by dividing the lower surface 4b into two areas substantially equal to each other in the width direction. Further, the interconnection 523 is laid around the base 40 and the first support 411 passing inside the area Q21 in the lower surface 4b of the beam 42, and is then laid around the base 40 and the first support 411 passing inside the area Q31 in the lower surface 4b of the beam 43.

The first detection signal interconnection 53 has terminals 531, 532 and an interconnection 533 wherein the terminal 531 is located at one end part of the first detection signal interconnection 53, and is disposed on the upper surface 4a of the base 40, the terminal 532 is located at the other end part of the first detection signal interconnection 53, and is disposed on the lower surface 4b of the first support 411, and the interconnection 533 electrically couples the terminals 531, 532 to each other. Further, the interconnection 533 is laid around the base 40 and the first support 411 passing the lower surface 4b of the beam 43 to electrically couple the terminals 531, 532 to each other. It should be noted that as described above, the lower surface 4b of the beam 43 has the two areas Q31, Q32 obtained by dividing the lower surface 4b into two areas substantially equal to each other in the width direction. Further, the interconnection 533 is laid around the base 40 and the first support 411 passing inside the area Q32 of the lower surface 4b of the beam 43. In other words, in the lower surface 4b of the beam 43, there are arranged the interconnections 533, 523 in the width direction of the beam 43.

The second detection signal interconnection 55 has terminals 551, 552 and an interconnection 553 wherein the terminal 551 is located at one end part of the second detection signal interconnection 55, and is disposed on the upper surface 4a of the base 40, the terminal 552 is located at the other end part of the second detection signal interconnection 55, and is disposed on the lower surface 4b of the first support 411, and the interconnection 553 electrically couples the terminals 551, 552 to each other. Further, the interconnection 553 is laid around the base 40 and the first support 411 passing the lower surface 4b of the beam 42 to electrically couple the terminals 551, 552 to each other. It should be noted that as described above, the lower surface 4b of the beam 42 has the two areas Q21, Q22 obtained by dividing the lower surface 4b into two areas substantially equal to each other in the width direction. Further, the interconnection 553 is laid around the base 40 and the first support 411 passing inside the area Q22 of the lower surface 4b of the beam 42. In other words, in the lower surface 4b of the beam 42, there are arranged the interconnections 553, 523 in the width direction of the beam 42.

The detection ground interconnection 54 has terminals 541, 542 and an interconnection 543 wherein the terminal 541 is located at one end part of the detection ground interconnection 54, and is disposed on the upper surface 4a of the base 40, the terminal 542 is located at the other end part of the detection ground interconnection 54, and is disposed on the lower surface 4b of the second support 412, and the interconnection 543 electrically couples the terminals 541, 542 to each other. The interconnection 543 is disposed so as to cover as broad range as possible of a portion exposed from the interconnections 51, 52, 53, and 55 of the support substrate 4 while keeping an electrically isolated state with the other interconnections 51, 52, 53, and 55. The detailed description will hereinafter be presented.

In the base 40, the interconnection 543 is disposed throughout a broad range of the upper surface 4a, the side surfaces, and the lower surface 4b of the base 40 while keeping an electrically isolated state with the other interconnections 51, 52, 53, and 55. Further, in the first and second supports 411, 412, the interconnection 543 is disposed throughout substantially the entire area of the upper surfaces 4a of the first and second supports 411, 412 while keeping an electrically isolated state with the other interconnections 51, 52, 53, and 55.

Further, in the beam 42, the interconnection 543 is disposed throughout the upper surface 4a, both of the side surfaces 4c, 4d, and both end parts in the width direction of the lower surface 4b of the beam 42 while keeping an electrically isolated state with the other interconnections 52, 55. Further, in the beam 43, the interconnection 543 is disposed throughout the upper surface 4a, both of the side surfaces 4c, 4d, and both end parts in the width direction of the lower surface 4b of the beam 43 while keeping an electrically isolated state with the other interconnections 52, 53. Further, in the beam 44, the interconnection 543 is disposed throughout the upper surface 4a, both of the side surfaces 4c, 4d, and both end parts in the width direction and the area Q42 of the lower surface 4b of the beam 44 while keeping an electrically isolated state with the other interconnection 51. Further, in the beam 45, the interconnection 543 is disposed throughout the upper surface 4a, both of the side surfaces 4c, 4d, and both end parts in the width direction and the area Q52 of the lower surface 4b of the beam 45 while keeping an electrically isolated state with the other interconnection 51.

By arranging the detection ground interconnection 54 in such a manner, it is possible to exert the following effects. In the beam 43, the interconnection 533 electrically coupled to the first detection signal electrode 83 is disposed on the lower surface 4b, and the interconnection 543 electrically coupled to the first and second detection ground electrodes 84, 86 is disposed on the upper surface 4a. By adopting such an arrangement, the interconnection 543 is located between the vibrator element 6 and the interconnection 533. Similarly, in the beam 42, the interconnection 553 electrically coupled to the second detection signal electrode 85 is disposed on the lower surface 4b, and the interconnection 543 electrically coupled to the first and second detection ground electrodes 84, 86 is disposed on the upper surface 4a. By adopting such an arrangement, the interconnection 543 is located between the vibrator element 6 and the interconnection 553.

The interconnection 543 is connected to the ground, namely a constant potential, and therefore, functions as a shield layer, and thus, it is possible to suppress the noise interference between the drive signal electrode 81 disposed in the vibrator element 6 and the interconnections 533, 553. Therefore, it is possible to effectively prevent the drive signal applied to the drive signal electrode 81 from mixing in the detection signal as a noise via the interconnections 533, 553. Therefore, it is possible to transmit the highly accurate detection signal high in S/N ratio to the circuit element 3, and thus, it is possible to detect the angular velocity we with higher accuracy.

In particular, in the present embodiment, in each of the beams 42, 43, the interconnection 543 is disposed not only on the upper surface 4a but also throughout both of the side surfaces 4c, 4d and the lower surface 4b. In other words, the interconnection 543 is disposed so as to surround the periphery of each of the interconnections 533, 553. Therefore, the shield effect described above is further enhanced, and it is possible to more effectively suppress the noise interference between the drive signal electrode 81 and the interconnections 533, 553. Further, on the lower surfaces 4b of the beams 42, 43, there is disposed the interconnection 523 electrically coupled to the drive constant-potential electrode 82 besides the interconnections 533, 553. The interconnection 523 is connected to the constant potential, and therefore, functions as a shield layer. Therefore, it is also possible to suppress the noise interference between the drive signal electrode 81 and the interconnections 533, 553 by the interconnection 523. It should be noted that the interconnection 523 can be connected to the ground.

Further, in the plan view from a direction along the C axis, the beam 43 on which the interconnection 533 is disposed crosses the drive arm 76, and has a portion opposed to the drive arm 76, namely a portion overlapping the drive arm 76. Further, in the plan view from the C-axis direction, the beam 42 on which the interconnection 553 is disposed crosses the drive arm 75, and has a portion overlapping the drive arm 75. Therefore, the interconnections 533, 553 disposed on the beams 42, 43 come closer to the drive signal electrode 81 disposed on the drive arms 75, 76, and the noise interference described above is extremely easy to occur. In such a positional relationship, by disposing the interconnection 543 functioning as the shield layer on the upper surfaces 4a of the beams 42, 43, namely between the drive signal electrode

81 and the interconnections 533, 553, it is possible to more remarkably exert the noise interference suppressing effect described above.

In particular, in the drive arms 75, 76 overlapping the beams 42, 43 in the plan view from a direction along the C axis, the drive signal electrode 81 is disposed on the both side surfaces 7c, 7d, the drive constant-potential electrode 82 is disposed on the lower surface 7a and the upper surface 7b. In other words, the drive signal electrode 81 is laterally oriented with respect to the interconnections 533, 553. Therefore, the capacitive coupling is apt to be formed between the first and second detection signal interconnections 53, 55 bypassing the beams 42, 43. Therefore, by disposing the interconnection 543 functioning as the shield layer on the upper surfaces 4a of the beams 42, 43, namely between the drive signal electrode 81 and the interconnections 533, 553, it is possible to more remarkably exert the noise interference suppressing effect between the drive signal electrode 81 and the first and second detection signal interconnections 53, 55.

Further, since the interconnection 543 is also disposed on the upper surfaces 4a of the first and second supports 411, 412, the interconnection 543 is disposed throughout a broader range, and thus, it is possible to more remarkably exert the noise interference suppressing effect described above. Further, by disposing the interconnection 543 throughout a broad range of the support substrate 4, it is also possible to effectively prevent the noise interference between the drive signal electrode 81 and the circuit element 3.

The vibrator device 1 is hereinabove described. As described above, such a vibrator device 1 is provided with the vibrator element 6, and the support substrate 4 which is disposed so as to be opposed to the vibrator element 6, provided with the upper surface 4a as a first surface at the vibrator element 6 side, and the lower surface 4b as a second surface at the opposite side to the upper surface 4a, and supports the vibrator element 6. Further, the vibrator element 6 has the drive arms 75, 76, 77, and 78 and the detection arms 71, 72 wherein the drive arms 75, 76, 77, and 78 are provided with the drive signal electrode 81 and the drive constant-potential electrode 82, and perform the drive vibration in response to application of the drive signal to the drive signal electrode 81, and the detection arms 71, 72 which have the first and second detection signal electrodes 83, 85 as the detection signal electrodes and the first and second detection ground electrodes 84, 86 as the detection constant-potential electrodes, and perform the detection vibration in response to the angular velocity $\omega c$ as the physical quantity of the detection target to thereby output the detection signal from the first and second detection signal electrodes 83, 85.

Further, the support substrate 4 has the base 40 supporting the vibrator element 6, the first and second support 411, 412 as supports supporting the base 40, the plurality of beams 42, 43, 44, and 45 coupling the base 40 and the first and second supports 411, 412 to each other, the drive signal interconnection 51 which is electrically coupled to the drive signal electrode 81, and is laid around the base 40 and the second support 412 passing at least one beam, namely the beams 44, 45 in the present embodiment, the drive constant-potential interconnection 52 which is electrically coupled to the drive constant-potential electrode 82, and is laid around the base 40 and the first support 411 passing at least one beam, namely the beams 42, 43 in the present embodiment, the first detection signal interconnection 53 as a detection signal interconnection which is electrically coupled to the first detection signal electrode 83, and is laid around the base 40 and the first support 411 passing at least one beam, namely the beam 43 in the present embodiment, the second detection signal interconnection 55 as a detection signal interconnection which is electrically coupled to the second detection signal electrode 85, and is laid around the base 40 and the first support 411 passing at least one beam, namely the beam 42 in the present embodiment, and the detection ground interconnection 54 as a detection constant-potential interconnection which is electrically coupled to the first and second detection ground electrodes 84, 86, and is laid around the base 40 and the first and second supports 411, 412 passing at least one beam, namely the beams 42 through 45 in the present embodiment.

Further, in the predetermined beam 43 included in the plurality of beams 42 through 45, the detection ground interconnection 54 is disposed on the upper surface 4a, the first detection signal interconnection 53 is disposed on the lower surface 4b, and in the predetermined beam 42 included in the plurality of beams 42 through 45, the detection ground interconnection 54 is disposed on the upper surface 4a, and the second detection signal interconnection 55 is disposed on the lower surface 4b.

According to such a configuration, in the beam 43, the detection ground interconnection 54 is located between the vibrator element 6 and the first detection signal interconnection 53. Similarly, in the beam 42, the detection ground interconnection 54 is located between the vibrator element 6 and the second detection signal interconnection 55. The detection ground interconnection 54 is connected to the ground, namely a constant potential, and therefore, functions as a shield layer, and thus, it is possible to suppress the noise interference between the drive signal electrode 81 disposed in the vibrator element 6 and the first and second detection signal interconnections 53, 55 disposed on the support substrate 4. Therefore, according to the vibrator device 1, it is possible to effectively prevent the drive signal applied to the drive signal electrode 81 from mixing in the detection signal as a noise via the first and second detection signal interconnections 53, 55. Therefore, it is possible to obtain the highly accurate detection signal high in S/N ratio, and thus, it is possible to detect the angular velocity $\omega c$ with higher accuracy.

Further, as described above, the predetermined beams 42, 43 each have the side surfaces 4c, 4d as the pair of beam side surfaces for connecting the upper surface 4a and the lower surface 4b to each other. Further, in the predetermined beams 42, 43, the detection ground interconnection 54 is disposed on the upper surface 4a, each of the side surfaces 4c, 4d, and the lower surface 4b. By adopting such an arrangement, it is possible to dispose the interconnection 543 so as to surround the periphery of each of the interconnections 533, 553. Therefore, the shield effect described above is further enhanced, and it is possible to more effectively suppress the noise interference between the drive signal electrode 81 and the interconnections 533, 553.

Further, as described above, the predetermined beam 42 has a portion opposed to the drive arm 75, and the predetermined beam 43 has a portion opposed to the drive arm 76. Therefore, the interconnections 533, 553 disposed on the beams 42, 43 come closer to the drive signal electrode 81 disposed on the drive arms 75, 76, and the noise interference described above is extremely easy to occur. In such a positional relationship, by disposing the detection ground interconnection 54 functioning as the shield layer on the upper surfaces 4a of the beams 42, 43, namely between the drive signal electrode 81 and the interconnections 533, 553, it is possible to more remarkably exert the noise interference suppressing effect described above.

Further, as described above, the drive arms 75, 76 each have the lower surface 7a as a third surface at the support substrate 4 side, the upper surface 7b as a fourth surface at the opposite side to the lower surface 7a, and the pair of side surfaces 7c, 7d each connecting the lower surface 7a and the upper surface 7b to each other. Further, the drive constant-potential electrode 82 is disposed on the lower surface 7a and the upper surface 7b, and the drive signal electrode 81 is disposed on each of the side surfaces 7c, 7d. In such a configuration, the capacitive coupling is apt to be formed between the first and second detection signal interconnections 53, 55 bypassing the beams 42, 43. Therefore, by disposing the interconnection 543 functioning as the shield layer on the upper surfaces 4a of the beams 42, 43, namely between the drive signal electrode 81 and the interconnections 533, 553, it is possible to more remarkably exert the noise interference suppressing effect between the drive signal electrode 81 and the first and second detection signal interconnections 53, 55.

Further, as described above, on the upper surfaces 4a of the first and second supports 411, 412, there is disposed the detection ground interconnection 54. Thus, it is possible to dispose the detection ground interconnection 54 throughout a broader range on the support substrate 4. Therefore, the noise interference suppressing effect described above can more remarkably be exerted.

Further, as described above, defining the three axes perpendicular to each other as the A axis, the B axis, and the C axis, and assuming that the vibrator element 6 and the support substrate 4 are opposed to each other in a direction along the C axis, the vibrator element 6 has the element base 70, the pair of detection arms 71, 72 extending toward the both sides along the B axis from the element base 70, the pair of coupling arms 73, 74 extending toward the both sides along the A axis from the element base 70, the pair of drive arms 75, 76 extending toward the both sides along the B axis from the tip part of the coupling arm 73, the pair of drive arms 77, 78 extending toward the both sides along the B axis from the tip part of the coupling arm 74, and the element base 70 is fixed to the base 40 via the bonding members B2. Thus, the vibrator element 6 capable of accurately detecting the angular velocity ωc is achieved.

Further, as described above, the vibrator device 1 has the circuit element 3 electrically coupled to the vibrator element 6. Further, between the vibrator element 6 and the circuit element 3, there is located the support substrate 4. According to such a configuration, the detection ground interconnection 54 and the drive constant-potential interconnection 52 disposed on the support substrate 4 function as shield layers, and thus, the noise interference between the vibrator element 6 and the circuit element 3 can effectively be suppressed.

Second Embodiment

Figure 10:
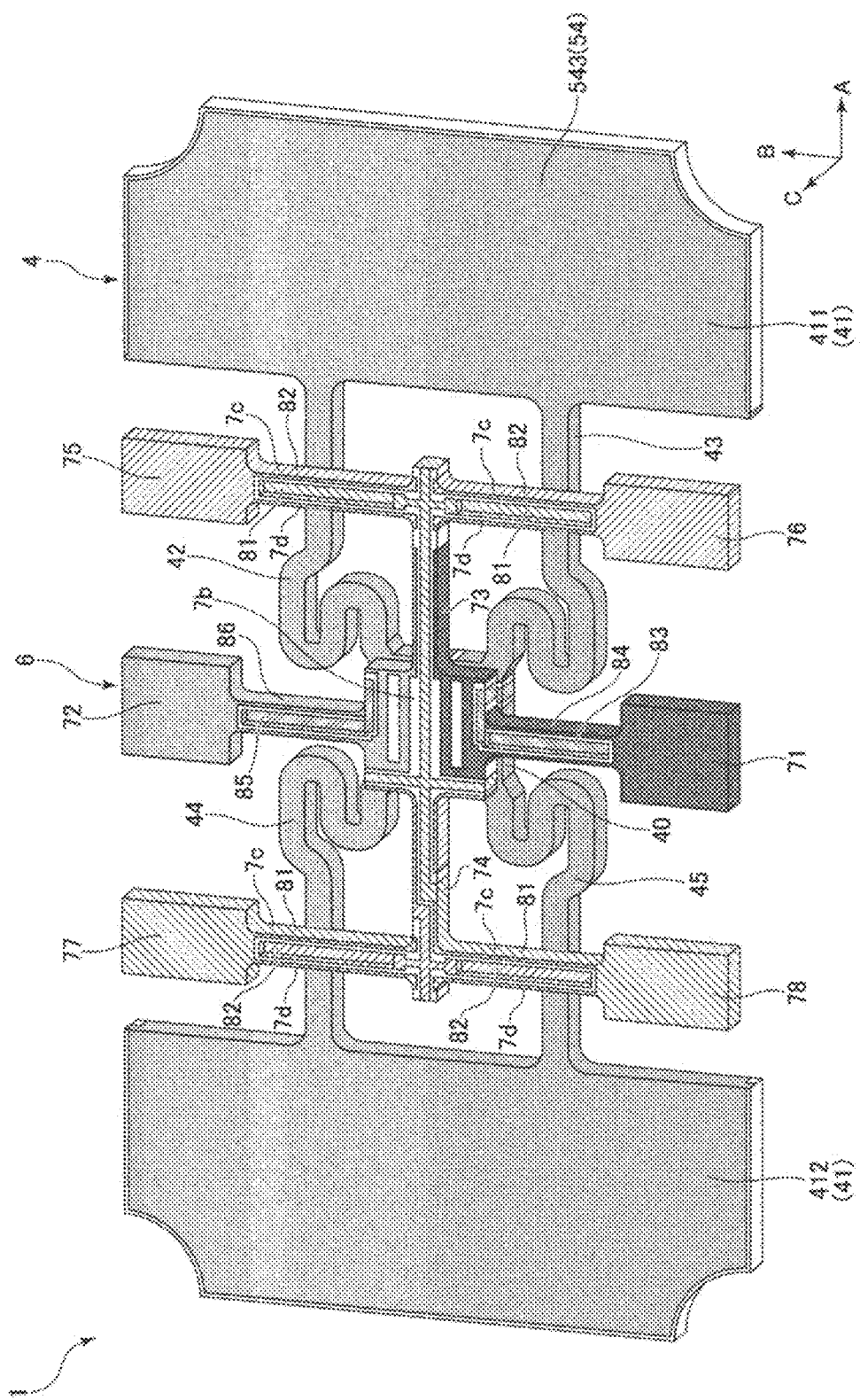
FIG. 10 is a perspective view of a support substrate provided to a vibrator device according to a second embodiment viewed from an upper side.
Figure 11:
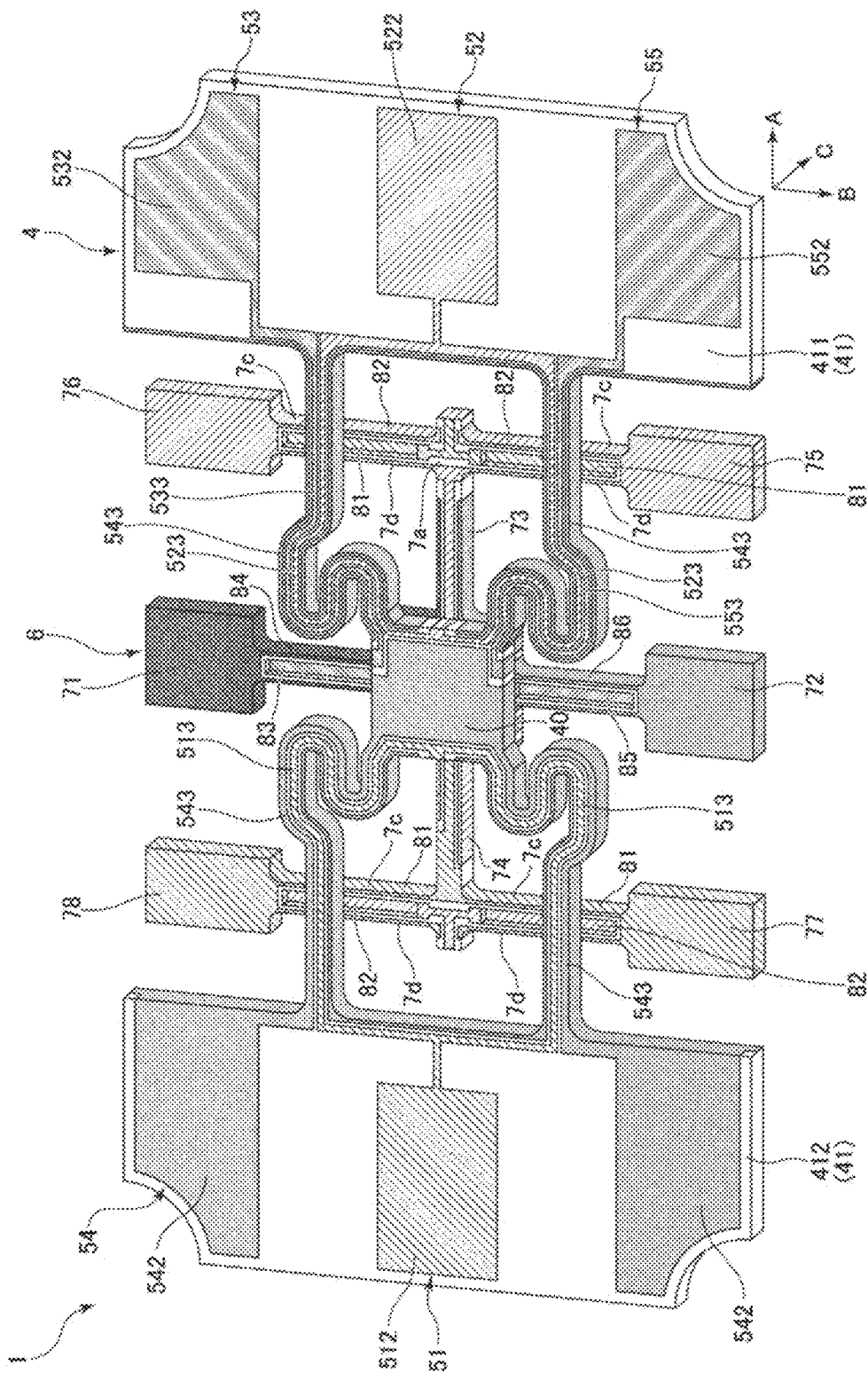
FIG. 11 is a perspective view of the support substrate shown in FIG. 10 viewed from a lower side.

FIG. 10 is a perspective view of a support substrate provided to a vibrator device according to a second embodiment viewed from an upper side. FIG. 11 is a perspective view of the support substrate shown in FIG. 10 viewed from a lower side.

The present embodiment is substantially the same as the first embodiment described above except the point that the vibrator element 6 is different. It should be noted that in the following description, the present embodiment will be described with a focus on the difference from the embodiment described above, and the description of substantially the same issues will be omitted. Further, in FIG. 10 and FIG. 11, the constituents substantially identical to those of the embodiment described above are denoted by the same reference symbols.

As shown in FIG. 10 and FIG. 11, the drive signal electrode 81 is disposed on the upper surface 7b and the lower surface 7a of each of the drive arms 75, 76, and the both side surfaces 7c, 7d of each of the drive arms 77, 78. On the other hand, the drive constant-potential electrode 82 is disposed on the both side surfaces 7c, 7d of each of the drive arms 75, 76, and the upper surface 7b and the lower surface 7a of each of the drive arms 77, 78.

In other words, in the drive arms 75, 76 overlapping the beams 42, 43 in the plan view from a direction along the C axis, the drive signal electrode 81 is disposed on the lower surface 7a and the upper surface 7b, and the drive constant-potential electrode 82 is disposed on the both side surfaces 7c, 7d. Therefore, the drive signal electrode 81 faces to the interconnections 533, 553, and thus, the capacitive coupling is apt to be formed between the drive signal electrode 81 and the first and second detection signal interconnections 53, 55 in some cases compared to when the drive signal electrode 81 is disposed on the both side surfaces 7c, 7d as in the drive arms 75, 76 in the first embodiment described above. Therefore, by disposing the interconnection 543 functioning as the shield layer on the upper surfaces 4a of the beams 42, 43, namely between the drive signal electrode 81 and the interconnections 533, 553, it is possible to more remarkably exert the noise interference suppressing effect between the drive signal electrode 81 and the first and second detection signal interconnections 53, 55.

As described above, the drive arms 75, 76 each have the lower surface 7a as the third surface at the support substrate 4 side, the upper surface 7b as the fourth surface at the opposite side to the lower surface 7a, and the side surfaces 7c, 7d as a pair of drive arm side surfaces each connecting the lower surface 7a and the upper surface 7b to each other. Further, the drive signal electrode 81 is disposed on the lower surface 7a and the upper surface 7b, and the drive constant-potential electrode 82 is disposed on each of the side surfaces 7c, 7d. Therefore, the drive signal electrode 81 disposed on the lower surface 7a faces to the support substrate 4, and the noise interference between the drive signal electrode 81 and the first and second detection signal interconnections 53, 55 is apt to occur. Therefore, by disposing the detection ground interconnection 54 functioning as the shield layer on the upper surfaces 4a of the beams 42, 43, namely between the drive signal electrode 81 and the first and second detection signal interconnections 53, 55, it is possible to more remarkably exert the noise interference suppressing effect described above.

According also to such a second embodiment as described above, substantially the same advantages as in the first embodiment described above can be exerted.

Third Embodiment

Figure 12:
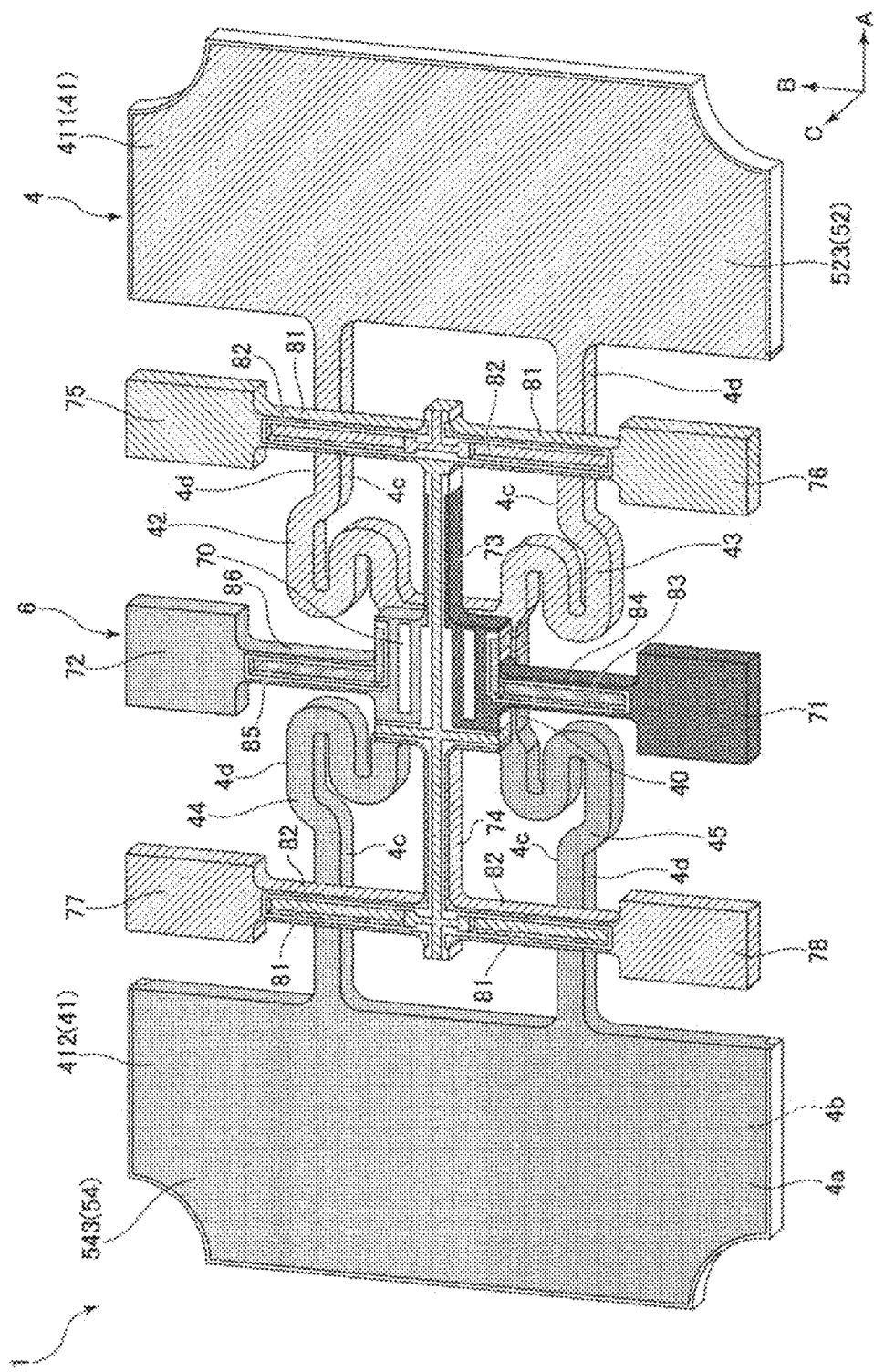
FIG. 12 is a perspective view of a support substrate provided to a vibrator device according to a third embodiment viewed from an upper side.
Figure 13:
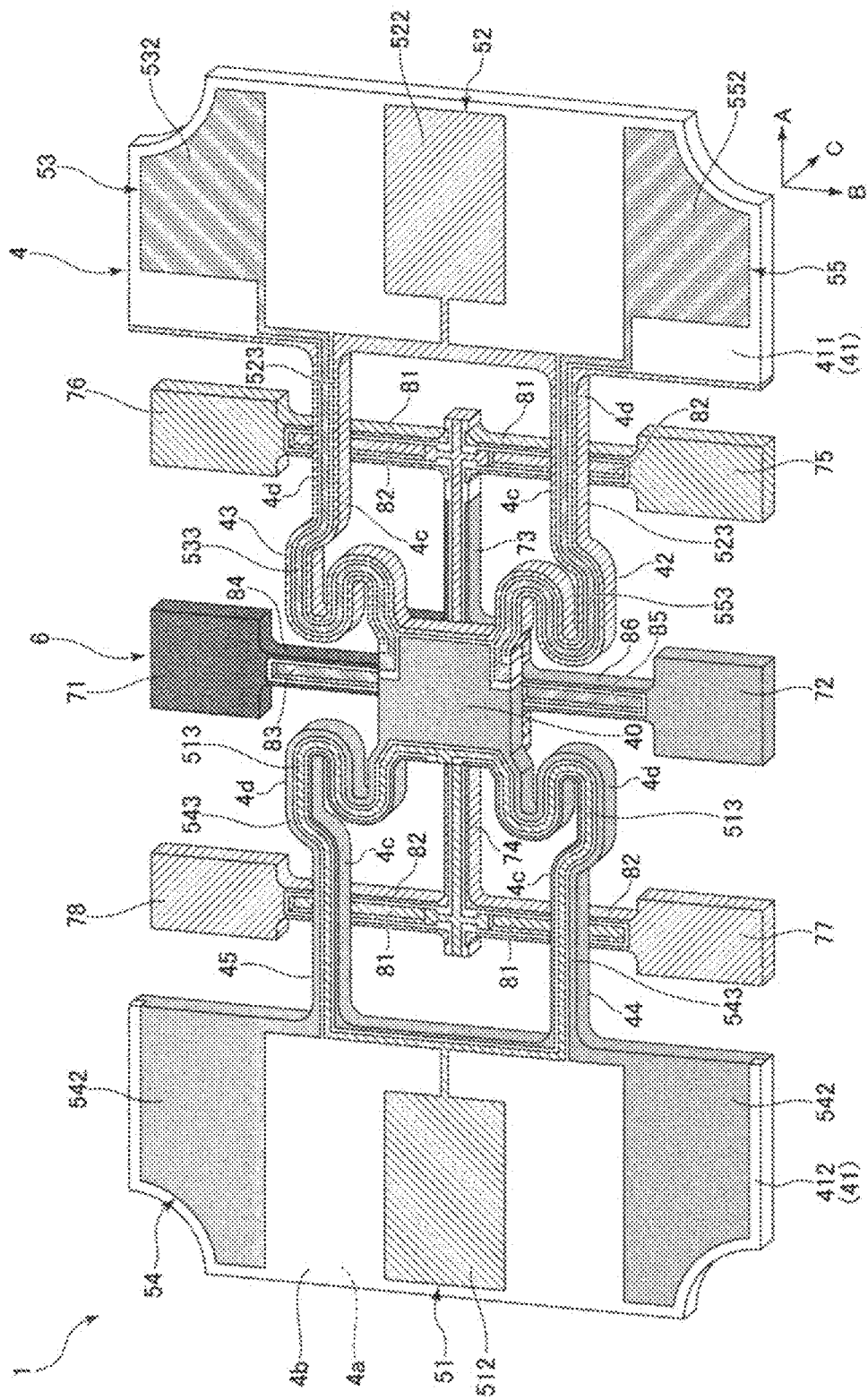
FIG. 13 is a perspective view of the support substrate shown in FIG. 12 viewed from a lower side.

FIG. 12 is a perspective view of a support substrate provided to a vibrator device according to a third embodiment viewed from an upper side. FIG. 13 is a perspective view of the support substrate shown in FIG. 12 viewed from a lower side.

The present embodiment is substantially the same as the first embodiment described above except the point that the configuration of the support substrate 4 is different. It should be noted that in the following description, the present embodiment will be described with a focus on the difference from the embodiment described above, and the description of substantially the same issues will be omitted. Further, in FIG. 12 and FIG. 13, the constituents substantially identical to those of the embodiment described above are denoted by the same reference symbols.

As shown in FIG. 12 and FIG. 13, the interconnection 513 of the drive signal interconnection 51 is laid around the base 40 and the second support 412 passing the lower surfaces 4b of the beams 44, 45 to electrically couple the terminals 511, 512 to each other. Further, the interconnection 533 of the first detection signal interconnection 53 is laid around the base 40 and the first support 411 passing the lower surface 4b of the beam 43 to electrically couple the terminals 531, 532 to each other. Further, the interconnection 553 of the second detection signal interconnection 55 is laid around the base 40 and the first support 411 passing the lower surface 4b of the beam 42 to electrically couple the terminals 551, 552 to each other. The arrangement of the drive signal interconnection 51, the first detection signal interconnection 53, and the second detection signal interconnection 55 is substantially the same as in the first embodiment described above.

In contrast, the interconnection 523 of the drive constant-potential interconnection 52 and the interconnection 543 of the detection ground interconnection 54 have a different arrangement from that of the first embodiment described above, and are disposed so as to cover as broad range as possible of a portion exposed from the interconnections 51, 52, 53, and 55 of the support substrate 4 while keeping an electrically isolated state with the other interconnections 51, 52, 53, and 55. The detailed description will hereinafter be presented.

In the base 40, the interconnection 543 is disposed throughout a broad range of the upper surface 4a, the side surfaces, and the lower surface 4b of the base 40 while keeping an electrically isolated state with the other interconnections 51, 52, 53, and 55. Further, in the first support 411, the interconnection 523 is disposed throughout substantially the entire area of the upper surface 4a of the first support 411 while keeping an electrically isolated state with the other interconnections 51, 52, 53, and 55. Meanwhile, in the second support 412, the interconnection 543 is disposed throughout substantially the entire area of the upper surface 4a of the second support 412 while keeping an electrically isolated state with the other interconnections 51, 52, 53, and 55.

Further, in the beam 42, the interconnection 523 is disposed throughout the upper surface 4a, both of the side surfaces 4c, 4d, and both end parts in the width direction of the lower surface 4b of the beam 42 while keeping an electrically isolated state with the other interconnection 55. Further, in the beam 43, the interconnection 523 is disposed throughout the upper surface 4a, both of the side surfaces 4c, 4d, and both end parts in the width direction of the lower surface 4b of the beam 43 while keeping an electrically isolated state with the other interconnection 53. Further, in the beam 44, the interconnection 543 is disposed throughout the upper surface 4a, both of the side surfaces 4c, 4d, and both end parts in the width direction of the lower surface 4b of the beam 44 while keeping an electrically isolated state with the other interconnection 51. Further, in the beam 45, the interconnection 543 is disposed throughout the upper surface 4a, both of the side surfaces 4c, 4d, and both end parts in the width direction of the lower surface 4b of the beam 45 while keeping an electrically isolated state with the other interconnection 51.

According to such a configuration as described above, it is possible to dispose the drive constant-potential interconnection 52 between the drive signal electrode 81 disposed on each of the drive arms 75, 76 and the first and second detection signal interconnections 53, 55 disposed on the lower surfaces 4b of the beams 42, 43. The drive constant-potential interconnection 52 is connected to the constant potential, and therefore, functions as a shield layer. Therefore, it is possible to suppress the noise interference between the drive signal electrode 81 disposed on the vibrator element 6 and the first and second detection signal interconnections 53, 55 disposed on the beams 42, 43. Therefore, it is possible to transmit the highly accurate detection signal high in S/N ratio to the circuit element 3, and thus, it is possible to detect the angular velocity ωc with higher accuracy. It should be noted that the drive constant-potential electrode 52 can be connected to the ground similarly to the detection ground interconnection 54.

As described above, in the predetermined beam 43 included in the plurality of beams 42 through 45, the drive constant-potential interconnection 52 is disposed on the upper surface 4a, the first detection signal interconnection 53 is disposed on the lower surface 4b, and in the predetermined beam 42 included in the plurality of beams 42 through 45, the drive constant-potential interconnection 52 is disposed on the upper surface 4a, and the second detection signal interconnection 55 is disposed on the lower surface 4b.

According to such a configuration, in the beam 43, the drive constant-potential interconnection 52 is located between the vibrator element 6 and the first detection signal interconnection 53. Similarly, in the beam 42, the drive constant-potential interconnection 52 is located between the vibrator element 6 and the second detection signal interconnection 55. The drive constant-potential interconnection 52 is connected to a constant potential, and therefore, functions as a shield layer, and thus, it is possible to suppress the noise interference between the drive signal electrode 81 disposed in the vibrator element 6 and the first and second detection signal interconnections 53, 55 disposed on the support substrate 4. Therefore, according to the vibrator device 1, it is possible to effectively prevent the drive signal applied to the drive signal electrode 81 from mixing in the detection signal as a noise via the first and second detection signal interconnections 53, 55. Therefore, it is possible to obtain the highly accurate detection signal high in S/N ratio, and thus, it is possible to detect the angular velocity we with higher accuracy.

According also to such a third embodiment as described above, substantially the same advantages as in the first embodiment described above can be exerted.

Fourth Embodiment

Figure 14:
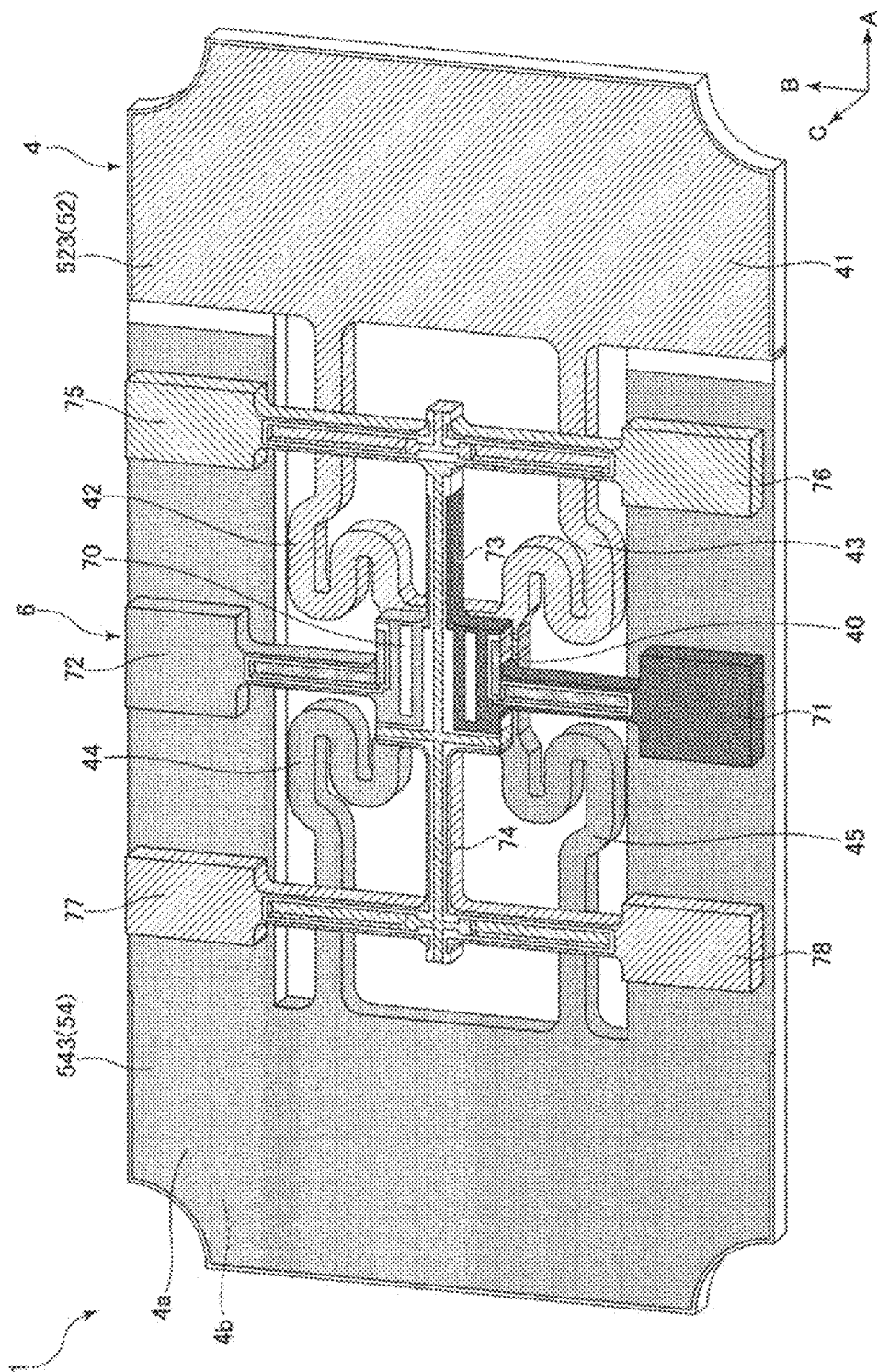
FIG. 14 is a perspective view of a support substrate provided to a vibrator device according to a fourth embodiment viewed from an upper side.

FIG. 14 is a perspective view of a support substrate provided to a vibrator device according to a fourth embodiment viewed from an upper side.

The present embodiment is substantially the same as the first embodiment described above except the point that the configuration of the support substrate 4 is different. It should be noted that in the following description, the present embodiment will be described with a focus on the difference from the embodiment described above, and the description of substantially the same issues will be omitted. Further, in FIG. 14, the constituents substantially identical to those of the embodiment described above are denoted by the same reference symbols.

As shown in FIG. 14, the support 41 has a frame-like shape surrounding the base 40 in the plan view in a direction along the C axis. Further, in substantially the entire area of the upper surface 4a of the support 41 having the frame-like shape, there are disposed the interconnection 523 of the drive constant-potential interconnection 52 and the interconnection 543 of the detection ground interconnection 54. By adopting such a configuration as described above, the area of the detection ground interconnection 54 increases compared to, for example, the first embodiment described above, and accordingly, it is possible to effectively suppress the noise interference between the drive signal electrode 81 and the first and second detection signal interconnections 53, 55 and the noise interference between the drive signal electrode 81 and the circuit element 3.

According also to such a fourth embodiment as described above, substantially the same advantages as in the first embodiment described above can be exerted.

Fifth Embodiment

Figure 15:
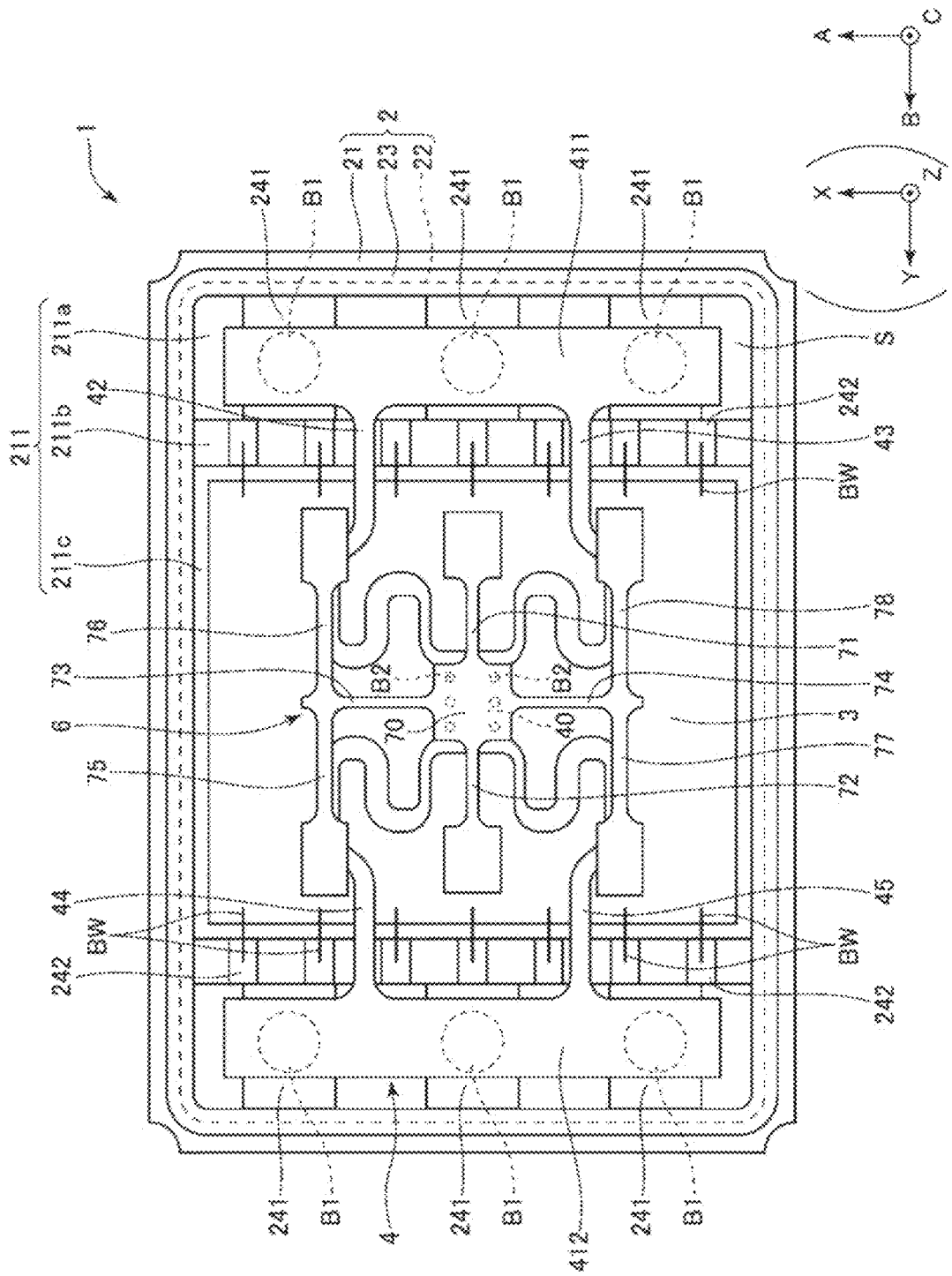
FIG. 15 is a plan view showing a vibrator device according to a fifth embodiment.

FIG. 15 is a plan view showing a vibrator device according to a fifth embodiment.

The present embodiment is substantially the same as the first embodiment described above except the point that the orientation of the vibrator element 6 is different. It should be noted that in the following description, the present embodiment will be described with a focus on the difference from the embodiment described above, and the description of substantially the same issues will be omitted. Further, in FIG. 15, the constituents substantially identical to those of the embodiment described above are denoted by the same reference symbols.

As shown in FIG. 15, in the vibrator device 1 according to the present embodiment, the vibrator element 6 is disposed with a rotation of 90° around the C axis from the orientation in the first embodiment.

According also to such a fifth embodiment as described above, substantially the same advantages as in the first embodiment described above can be exerted.

Sixth Embodiment

Figure 16:
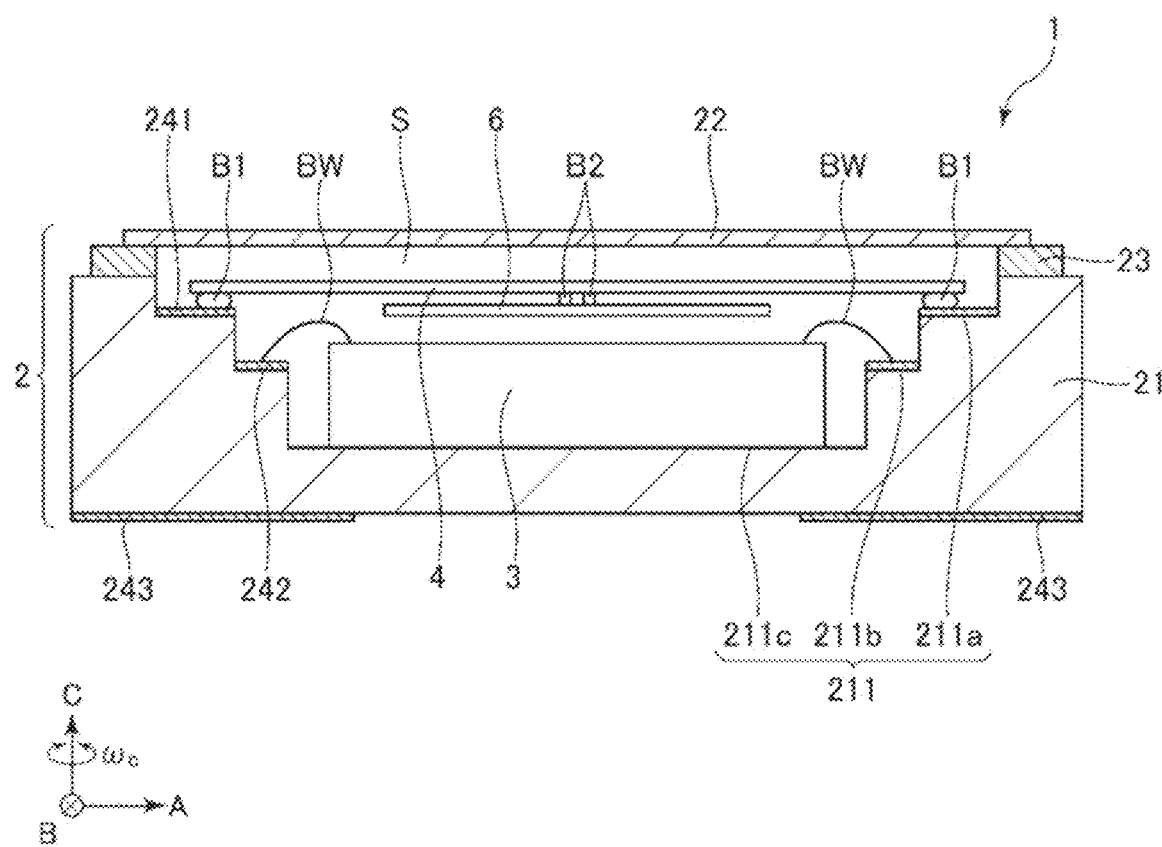
FIG. 16 is a cross-sectional view showing a vibrator device according to a sixth embodiment.

FIG. 16 is a cross-sectional view showing a vibrator device according to a sixth embodiment.

The present embodiment is substantially the same as the first embodiment described above except the point that the arrangement of the vibrator element 6 is different. It should be noted that in the following description, the present embodiment will be described with a focus on the difference from the embodiment described above, and the description of substantially the same issues will be omitted. Further, in FIG. 16, the constituents substantially identical to those of the embodiment described above are denoted by the same reference symbols.

As shown in FIG. 16, the vibrator element 6 is disposed between the support substrate 4 and the circuit element 3. In other words, the vibrator element 6 is located on the lower side of the support substrate 4, and is supported so as to be suspended from the support substrate 4. According to such a configuration as described above, since it is possible to dispose the vibrator element 6 in a space between the support substrate 4 and the circuit element 3, reduction in size, in particular, reduction in thickness of the vibrator device 1 can accordingly be achieved. It should be noted that there is a possibility that the noise suppressing effect is somewhat degraded compared to the first embodiment described above in the point that, for example, the noise interference between the circuit element 3 and the vibrator element 6 cannot be suppressed by the support substrate 4.

According also to such a sixth embodiment as described above, substantially the same advantages as in the first embodiment described above can be exerted.

Seventh Embodiment

Figure 17:
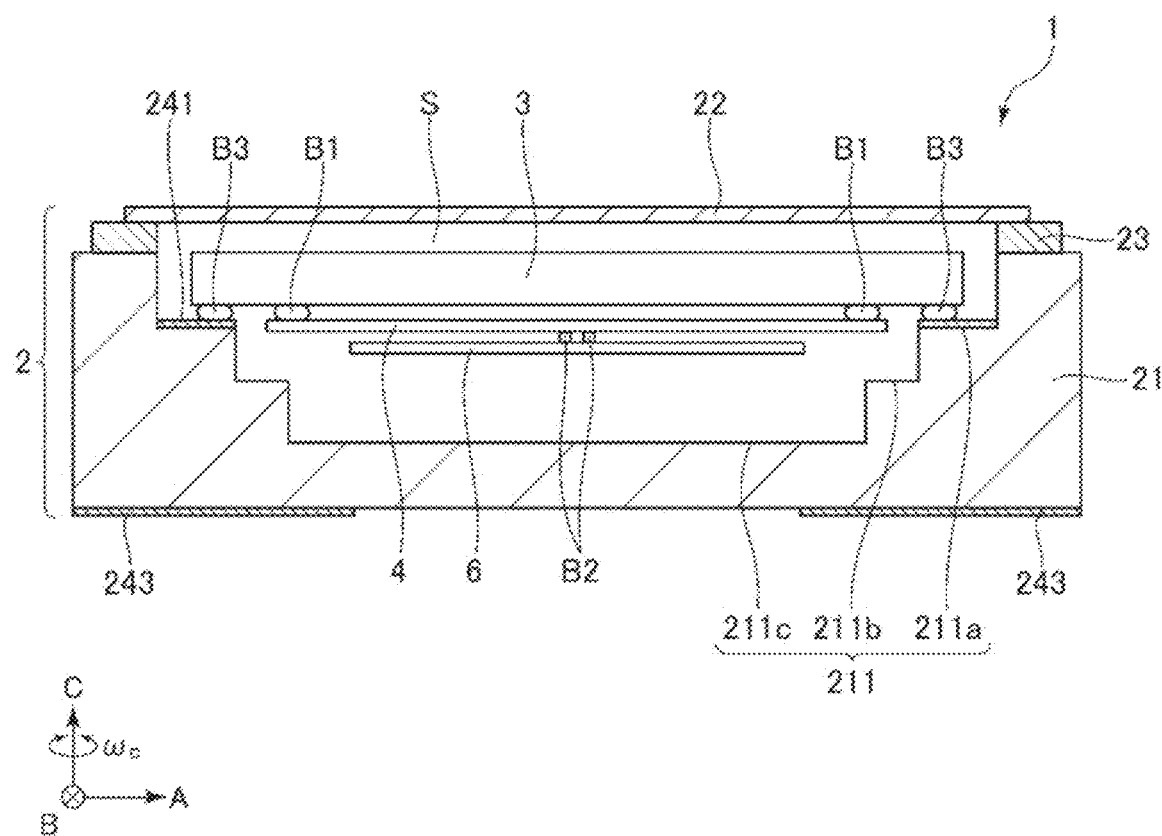
FIG. 17 is a cross-sectional view showing a support substrate provided to a vibrator device according to a seventh embodiment.

FIG. 17 is a cross-sectional view showing a support substrate provided to a vibrator device according to a seventh embodiment.

The present embodiment is substantially the same as the sixth embodiment described above except the point that the arrangement of the circuit element 3 is different. It should be noted that in the following description, the present embodiment will be described with a focus on the difference from the embodiment described above, and the description of substantially the same issues will be omitted. Further, in FIG. 17, the constituents substantially identical to those of the embodiment described above are denoted by the same reference symbols.

As shown in FIG. 17, in the vibrator device 1 according to the present embodiment, the circuit element 3 is fixed to the bottom surface of the recessed part 211a via bonding members B3 having electrical conductivity, the support substrate 4 is fixed to the lower surface of the circuit element 3 via the bonding members B1, and the vibrator element 6 is fixed to the lower surface of the support substrate 4 via the bonding members B2. By making the support substrate 4 and the circuit element 3 intervene between the vibrator element 6 and the base 21 as described above, it is possible to absorb or relax the stress propagating from the base 21 due to the support substrate 4 and the circuit element 3, and thus, it becomes difficult for the stress to reach the vibrator element 6. Therefore, it is possible to effectively prevent the degradation and the fluctuation of the vibration characteristics of the vibrator element 6. Further, according to the present embodiment, since it is possible to dispose the circuit element 3 inside the recessed part 211a, the circuit element 3 is allowed to increase in size compared to when disposing the circuit element 3 inside the recessed part 211c as in the first embodiment described above.

According also to such a seventh embodiment as described above, substantially the same advantages as in the first embodiment described above can be exerted.

Eighth Embodiment

Figure 18:
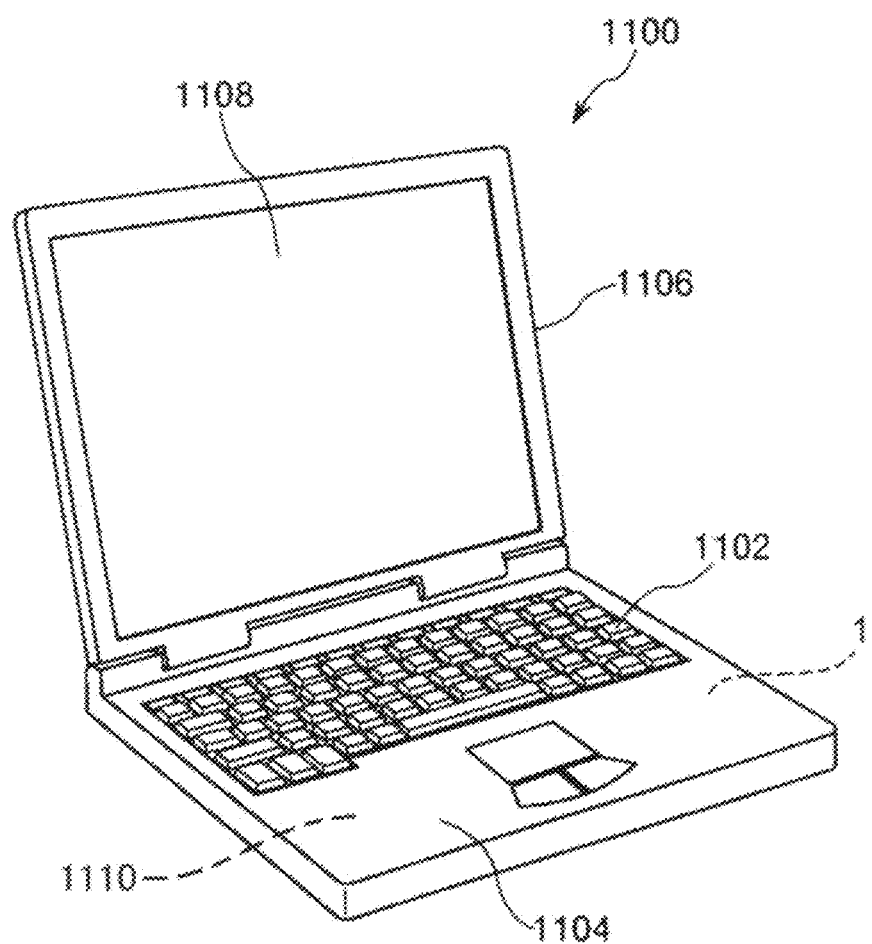
FIG. 18 is a perspective view showing a personal computer according to an eighth embodiment.

FIG. 18 is a perspective view showing a personal computer according to an eighth embodiment.

A personal computer 1100 as an electronic apparatus shown in FIG. 18 is constituted by a main body section 1104 equipped with a keyboard 1102, and a display unit 1106 equipped with a display section 1108, and the display unit 1106 is pivotally supported with respect to the main body section 1104 via a hinge structure. Further, the personal computer 1100 incorporates the vibrator device 1 as a physical quantity sensor, and a signal processing circuit 1110 for performing signal processing, namely control of each section, based on an output signal from the vibrator device 1.

As described above, the personal computer 1100 as the electronic apparatus is provided with the vibrator device 1, and the signal processing circuit 1110 for performing the signal processing based on the output signal of the vibrator device 1. Therefore, it is possible to appreciate the advantages of the vibrator device 1 described above, and the high reliability can be exerted.

Ninth Embodiment

Figure 19:
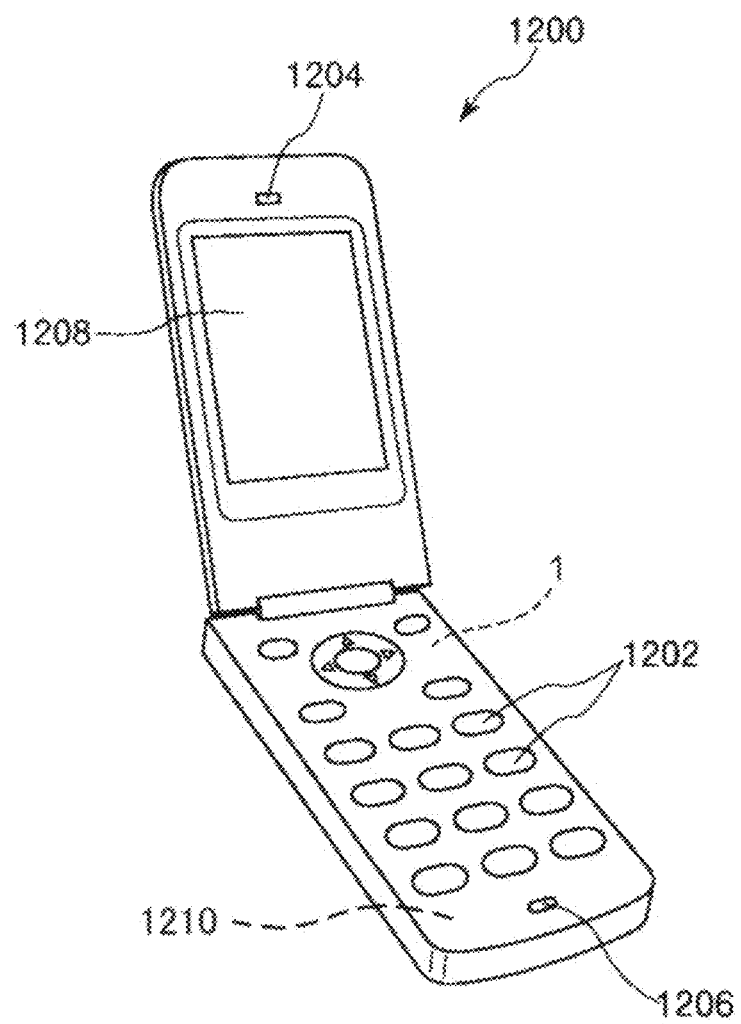
FIG. 19 is a perspective view showing a cellular phone according to a ninth embodiment.

FIG. 19 is a perspective view showing a cellular phone according to a ninth embodiment.

A cellular phone 1200 as an electronic apparatus shown in FIG. 19 is provided with an antenna not shown, a plurality of operation buttons 1202, an ear piece 1204, and a mouthpiece 1206, and a display section 1208 is disposed between the operation buttons 1202 and the ear piece 1204. Further, the cellular phone 1200 incorporates the vibrator device 1 as a physical quantity sensor, and a signal processing circuit 1210 for performing signal processing, namely control of each section, based on the output signal from the vibrator device 1.

As described above, the cellular phone 1200 as the electronic apparatus is provided with the vibrator device 1, and the signal processing circuit 1210 for performing the signal processing based on the output signal of the vibrator device 1. Therefore, it is possible to appreciate the advantages of the vibrator device 1 described above, and the high reliability can be exerted.

Tenth Embodiment

Figure 20:
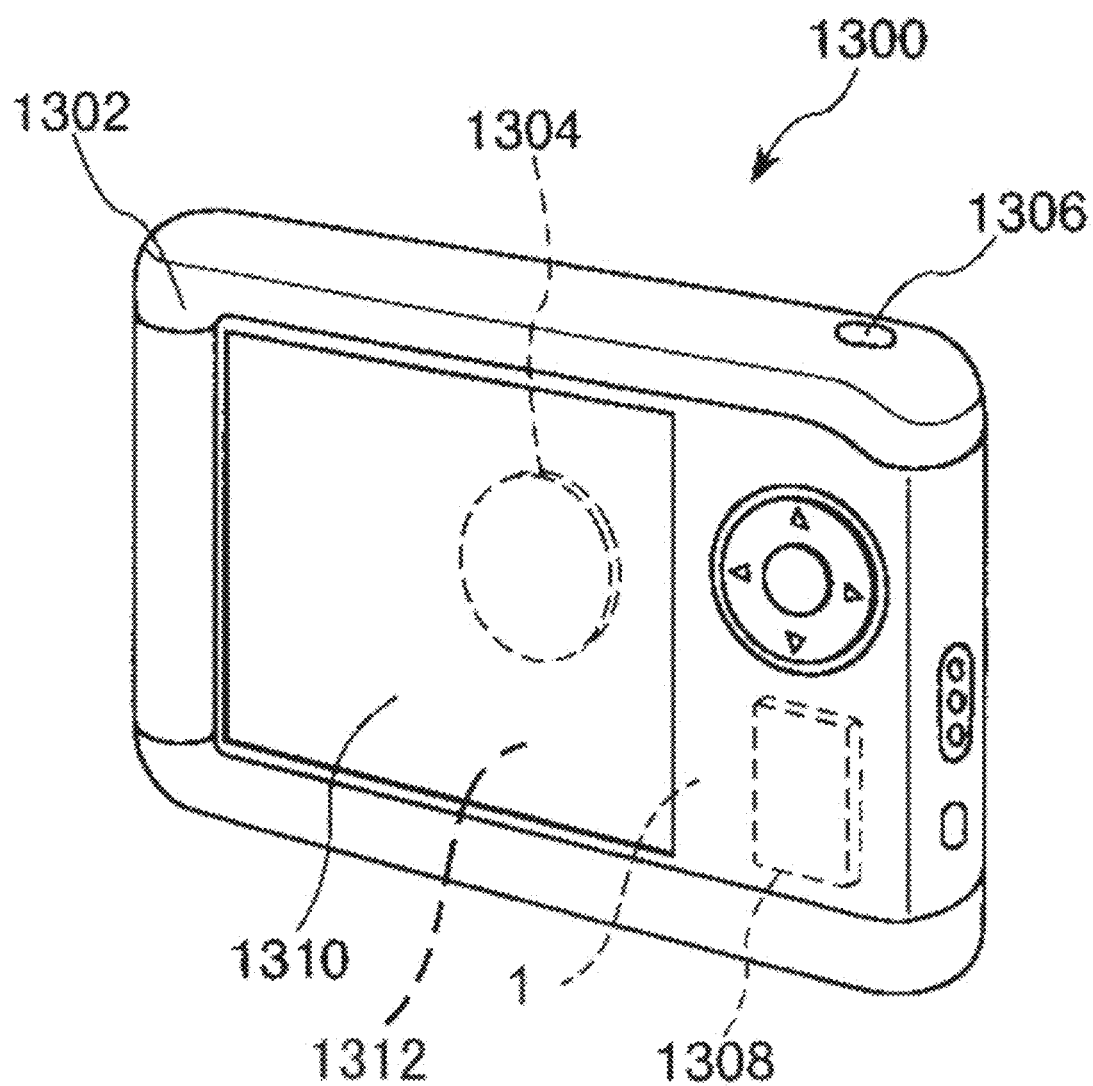
FIG. 20 is a perspective view showing a digital still camera according to a tenth embodiment.

FIG. 20 is a perspective view showing a digital still camera according to a tenth embodiment.

A digital still camera 1300 as an electronic apparatus shown in FIG. 20 is provided with a case 1302, and on a back surface of the case 1302, there is disposed a display section 1310. The display section 1310 is provided with a configuration of performing display based on an imaging signal due to a CCD, and functions as a finder for displaying the photographic subject as an electronic image. Further, on the front side of the case 1302, there is disposed a light receiving unit 1304 including an optical lens, the CCD, and so on. Then, when the photographer checks an object image displayed on the display 1310, and then presses a shutter button 1306, the imaging signal from the CCD at that moment is transferred to and stored in a memory 1308. Further, the digital still camera 1300 incorporates the vibrator device 1 as a physical quantity sensor, and a signal processing circuit 1312 for performing signal processing, namely control of each section, based on the output signal from the vibrator device 1.

As described above, the digital still camera 1300 as the electronic apparatus is provided with the vibrator device 1, and the signal processing circuit 1312 for performing the signal processing based on the output signal of the vibrator device 1. Therefore, it is possible to appreciate the advantages of the vibrator device 1 described above, and the high reliability can be exerted.

It should be noted that the electronic apparatus equipped with the vibrator device 1 can also be, for example, a smartphone, a tablet terminal, a timepiece including a smart watch, an inkjet type ejection device such as an inkjet printer, a wearable terminal such as an HMD (a head-mounted display) and a pair of smart glasses, a television set, a video camera, a video cassette recorder, a car navigation system, a pager, a personal digital assistance, an electronic dictionary, an electronic translator, an electronic calculator, a computerized game machine, training equipment, a word processor, a workstation, a video phone, a security video monitor, a pair of electronic binoculars, a POS terminal, medical equipment such as an electronic thermometer, an electronic manometer, an electronic blood sugar meter, an electrocardiogram measurement instrument, an ultrasonograph, and an electronic endoscope, a fish detector, a variety of types of measurement instruments, a variety of types of gauges to be installed in a car, an aircraft, a ship, or a boat, a base station for mobile terminals, and a flight simulator, besides the personal computer 1100, the mobile phone 1200, and the digital still camera 1300 described above.

Eleventh Embodiment

Figure 21:
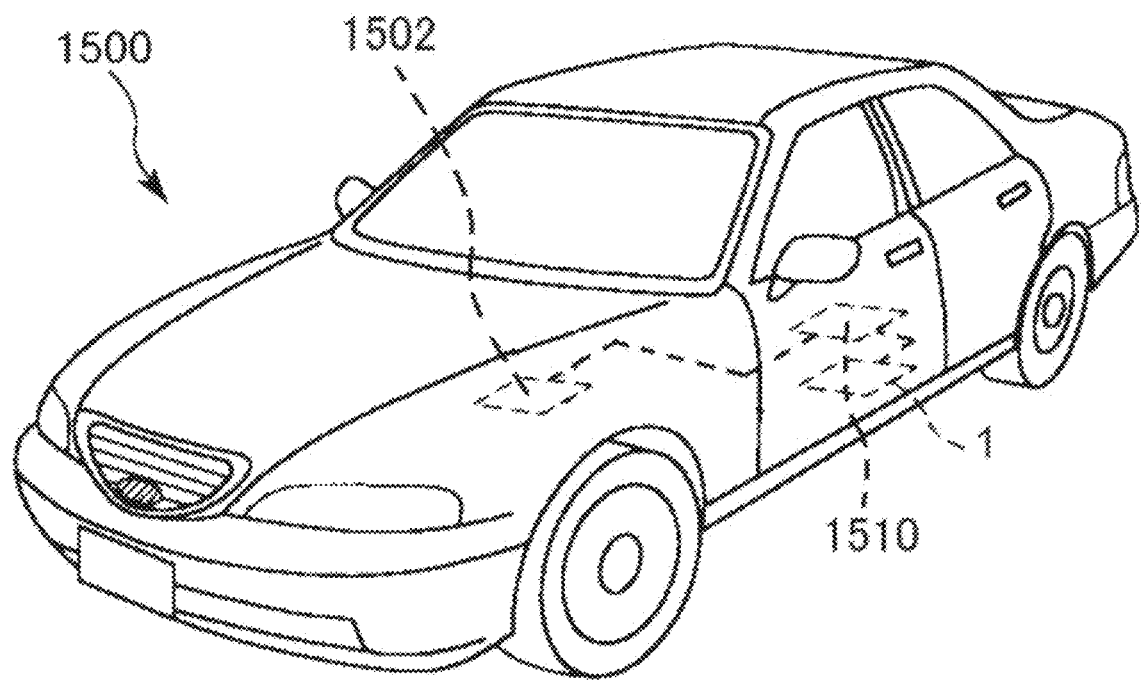
FIG. 21 is a perspective view showing a car according to an eleventh embodiment.

FIG. 21 is a perspective view showing a car according to an eleventh embodiment.

A car 1500 as a vehicle shown in FIG. 21 includes a system 1502 such as an engine system, a brake system, a steering system, an attitude control system, or a keyless entry system. Further, the car 1500 incorporates the vibrator device 1 as a physical quantity sensor, and a signal processing circuit 1510 for performing signal processing, namely control of the system 1502, based on the output signal from the vibrator device 1.

As described above, the car 1500 as the vehicle is provided with the vibrator device 1, and the signal processing circuit 1510 for performing the signal processing based on the output signal of the vibrator device 1. Therefore, it is possible to appreciate the advantages of the vibrator device 1 described above, and the high reliability can be exerted.

It should be noted that the vehicle equipped with the vibrator device 1 can also be, for example, a robot, a drone, an electric wheelchair, a two-wheeled vehicle, an airplane, a helicopter, a ship, an electric train, a monorail, a cargo-carrying vehicle, a rocket, or a space vehicle besides the car 1500.

Although the vibrator device, the electronic apparatus, and the vehicle according to the present disclosure are described based on the illustrated embodiments, the present disclosure is not limited thereto, but the configuration of each of the sections can be replaced with an arbitrary configuration having substantially the same function. Further, the present disclosure can also be added with any other constituents. Further, it is also possible to arbitrarily combine any of the embodiments with each other.

What is claimed is:

1. A vibrator device comprising:
a vibrator element; and
a support substrate which is disposed so as to be opposed to the vibrator element, provided with a first surface at the vibrator element side and a second surface at an opposite side to the first surface, and supports the vibrator element, wherein
the vibrator element includes
a drive arm which is provided with a drive signal electrode and a drive constant-potential electrode, and performs a drive vibration in response to a drive signal applied to the drive signal electrode, and
a detection arm which is provided with a detection signal electrode and a detection constant-potential electrode, and performs a detection vibration in accordance with a physical quantity of a detection target to thereby output a detection signal from the detection signal electrode,
the support substrate includes
a base configured to support the vibrator element,
a support configured to support the base,
a plurality of beams configured to couple the base and the support to each other, a drive signal interconnection which is electrically coupled to the drive signal electrode, and is laid around the base and the support passing at least one of the beams, a drive constant-potential interconnection which is electrically coupled to the drive constant-potential electrode, and is laid around the base and the support passing at least one of the beams, a detection signal interconnection which is electrically coupled to the detection signal electrode, and is laid around the base and the support passing at least one of the beams, and a detection constant-potential interconnection which is electrically coupled to the detection constant-potential electrode, and is laid around the base and the support passing at least one of the beams, and in a predetermined beam included in the plurality of beams, at least one of the drive constant-potential interconnection and the detection constant-potential interconnection is disposed on the first surface, and the detection signal interconnection is disposed on the second surface.

2. The vibrator device according to claim 1, wherein
the predetermined beam has a pair of beam side surfaces configured to couple the first surface and the second surface to each other, and in the predetermined beam, one of the drive constant-potential interconnection and the detection constant-potential interconnection is disposed on the first surface, each of the beam side surfaces, and the second surface.

3. The vibrator device according to claim 1, wherein
the predetermined beam has a portion opposed to the drive arm.

4. The vibrator device according to claim 3, wherein
the drive arm has a third surface at the support substrate side, a fourth surface at an opposite side to the third surface, and a pair of drive arm side surfaces configured to couple the third surface and the fourth surface to each other, the drive signal electrode is disposed on the third surface and the fourth surface, and the drive constant-potential electrode is disposed on each of the drive arm side surfaces.

5. The vibrator device according to claim 3, wherein
the drive arm has a third surface at the support substrate side, a fourth surface at an opposite side to the third surface, and a pair of drive arm side surfaces configured to couple the third surface and the fourth surface to each other, the drive constant-potential electrode is disposed on the third surface and the fourth surface, and the drive signal electrode is disposed on each of the drive arm side surfaces.

6. The vibrator device according to claim 1, wherein
one of the drive constant-potential interconnection and the detection constant-potential interconnection is disposed on the first surface of the support.

7. The vibrator device according to claim 1, wherein
the support has a frame-like shape surrounding the base.

8. The vibrator device according to claim 1, wherein
defining three axes perpendicular to each other as an A axis, a B axis, and a C axis, and the vibrator element and the support substrate are opposed to each other in a direction along the C axis, the vibrator element includes
an element base,
a pair of detection arms including the detection arm, the pair of detection arms extending toward both sides along the B axis from the element base,
a pair of coupling arms extending toward both sides along the A axis from the element base,
a pair of drive arms including the drive arm, the pair of drive arms extending toward both sides along the B axis from a tip of one of the coupling arms, and
a second pair of drive arms extending toward both sides along the B axis from a tip of the other of the coupling arms, and the element base is fixed to the base via a bonding member.

9. The vibrator device according to claim 1, further comprising:
a circuit element electrically coupled to the vibrator element, wherein
the support substrate is located between the vibrator element and the circuit element.

10. An electronic apparatus comprising:
the vibrator device according to claim 1; and
a signal processing circuit configured to perform signal processing based on an output signal of the vibrator device.

11. A vehicle comprising:
the vibrator device according to claim 1; and
a signal processing circuit configured to perform signal processing based on an output signal of the vibrator device.

* * * * *